(12) United States Patent
Fujiune et al.

(10) Patent No.: US 7,586,818 B2
(45) Date of Patent: Sep. 8, 2009

(54) OPTICAL DISC APPARATUS AND SEMICONDUCTOR DEVICE

(75) Inventors: Kenji Fujiune, Osaka (JP); Yuuichi Kuze, Osaka (JP); Katsuya Watanabe, Nara (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 11/597,685

(22) PCT Filed: May 27, 2005

(86) PCT No.: PCT/JP2005/009740

§ 371 (c)(1),
(2), (4) Date: Nov. 27, 2006

(87) PCT Pub. No.: WO2005/122157

PCT Pub. Date: Dec. 22, 2005

(65) Prior Publication Data

US 2008/0068950 A1 Mar. 20, 2008

(30) Foreign Application Priority Data

May 28, 2004 (JP) ............................. 2004-159135

(51) Int. Cl.
*G11B 7/00* (2006.01)
(52) U.S. Cl. .............. 369/44.29; 369/44.35; 369/44.27; 369/53.37
(58) Field of Classification Search .............. 369/44.29, 369/44.35, 44.36, 44.27, 53.37, 94
See application file for complete search history.

(56) References Cited

U.S. PATENT DOCUMENTS

| 5,859,824 | A | 1/1999 | Izumi et al. |
|---|---|---|---|
| 6,101,157 | A | 8/2000 | Bradshaw et al. |
| 6,324,133 | B1 * | 11/2001 | Ichimura ................. 369/44.29 |
| 7,345,961 | B2 * | 3/2008 | Kishimoto et al. ....... 369/30.27 |
| 7,480,218 | B2 * | 1/2009 | Yoshikawa et al. ....... 369/44.29 |
| 7,522,482 | B2 * | 4/2009 | Tateishi et al. ........... 369/44.29 |
| 7,522,485 | B2 * | 4/2009 | Maruyama et al. ....... 369/44.29 |
| 2001/0053111 | A1 | 12/2001 | Hashimoto |
| 2002/0150016 | A1 | 10/2002 | Yasuda et al. |
| 2004/0196766 | A1 | 10/2004 | Tadano |

FOREIGN PATENT DOCUMENTS

| JP | 5-250705 | 9/1993 |
|---|---|---|
| JP | 8-185636 | 7/1996 |
| JP | 9-320068 | 12/1997 |
| JP | 10-320792 | 12/1998 |
| JP | 11-73657 | 3/1999 |
| JP | 11-213402 | 8/1999 |
| JP | 2002-373431 | 12/2002 |
| JP | 2002-373441 | 12/2002 |
| JP | 2003-99970 | 4/2003 |
| JP | 2003-123282 | 4/2003 |
| JP | 2004-273000 | 9/2004 |

* cited by examiner

*Primary Examiner*—Thang V Tran
(74) *Attorney, Agent, or Firm*—Wenderoth, Lind & Ponack, L.L.P.

(57) ABSTRACT

The purpose is to provide an optical disc apparatus which can accurately calculate a gain for focus control. An optical apparatus (100) includes: an FE generator (20) for generating an FE signal; an AS generator for generating an AS signal (21); a normalization operator (22); an Fc filter (23); a selector (24); a spherical aberration setting device (34); an FE amplitude measuring device (30); an Fc pull-in instructor (52); an after-pull-in AS measuring device (40); and a gain operator (32). The optical apparatus obtains an amplitude of the FE signal before the focus is pulled in, and obtains a level of the AS signal after the focus is pulled in to adjust a focus gain.

38 Claims, 11 Drawing Sheets

US 7,586,818 B2

OPTICAL DISC APPARATUS AND SEMICONDUCTOR DEVICE

TECHNICAL FIELD

The present invention relates to an optical disc apparatus and a semiconductor device, particularly, an optical disc apparatus and a semiconductor device for recording or reproducing information to or from a recordable information carrier having a disc shape (hereinafter, referred to as an optical disc).

BACKGROUND ART

In a conventional optical disc apparatus, for reproducing a signal, an optical disc which is an information carrier is irradiated with a relatively weak optical beam of a constant amount of light, and the light reflected from the optical disc is modulated to be stronger or weaker and is then detected. For recording a signal, the intensity of the optical beam is modulated to be stronger or weaker in accordance with a signal to be recorded and information is written on a recording material film on an optical disc.

On an optical disc for reproduction only, information is previously recorded in a spiral pattern with pits. An optical disc for both recording and reproduction is produced by forming a film of a material which can be optically recorded or reproduced on a surface of a base material having a track of a convex-concave structure in a spiral pattern by a method such as evaporation.

For recording information on or reproducing information recorded on an optical disc, focus control and tracking control are required. Focus control is control of an optical head along a line normal to a surface of the optical disc (hereinafter, referred to as a focus direction) so as to have a optical beam to always be in a predetermined convergence state on a recording material film. Tracking control is control of an optical head in a radial direction of an optical disc (hereinafter, referred to as a tracking direction) so as to have a optical beam to always be on a predetermined track.

An operation of a conventional optical disc apparatus will be described with reference to FIGS. 9 through 11.

FIG. 9 is a block diagram of the optical disc apparatus.

FIG. 10(a) shows an example of a signal output from an FE generator 20. FIG. 10(b) shows an example of a signal output from an AS generator 21. In FIG. 10, a horizontal axis indicates a position of a focus of an optical beam in the focus direction with respect to an optical disc 1.

FIG. 11(a) shows an example of a signal output from the FE generator 20 when the optical disc 1 is either in a recorded state or an unrecorded state. FIG. 11(b) shows an example of a signal output from the AS generator 21 when the optical disc 1 is either in a recorded state or an unrecorded state. FIG. 11(c) shows an example of a signal output from a normalization operator 22. In FIG. 11, a horizontal axis indicates a position of a focus of an optical beam in the focus direction with respect to the optical disc 1.

As shown in FIG. 9, the unit for detecting focus error is an FE generator 20. The unit for detecting light amount is an AS generator 21. The unit for normalizing focus error is a normalization operator 22. The unit for focus control includes an Fc filter 23 and a selector 24. The unit for measuring amplitude is an FE amplitude measuring device 30. The unit for calculating gain is a gain operator 32.

An optical head 10 includes a semiconductor laser 11, a condensing lens 13, a beam splitter 12, a focus actuator 14, a tracking actuator 15, and a photodetector 17.

An optical beam generated from the semiconductor laser 11 passes through the beam splitter 12 and is converged on the optical disc 1 having a disc shape by the condensing lens 13. The optical beam reflected off the optical disc 1 passes through the condensing lens 13 again, and is reflected off the beams splitter 12 to impinge upon the photodetector 17. The condensing lens 13 is supported by an elastic body (not shown). When a current flows through the focus actuator 14, the condensing lens 13 is moved in the focus direction by an electromagnetic force. When a current flows through the tracking actuator 15, the condensing lens 13 is moved in the tracking direction by an electromagnetic force. The photodetector 17 sends the detected light amount signal respectively to the FE generator 20 and the AS generator 21.

From the light amount signal of the photodetector 17, the FE generator 20 calculates an error signal indicating a convergence state of the optical beam on an information surface of the optical disc 1, i.e., an error signal which corresponds to a shift in a position of the focus of the optical beam with respect to the information surface of the optical disc 1 (hereinafter, referred to as an FE signal). The FE generator 20 sends the FE signal to the normalization operator 22 and the FE amplitude measuring device 30. The AS generator 21 detects an amount of light reflected off the optical disc 1 based on the signal from the photodetector 17 and sends the detected amount of light to the normalization operator 22 and an AS level measuring device 31.

The normalization operator 22 divides the signal from the FE generator 20 by the signal from the AS generator 21 and multiply the result by an internal gain. The normalized signal is then sent to the Fc filter 23. The Fc filter 23 generates a driving signal for focus control based on the signal from the normalization operator 22 and sends the signal to the focus actuator 14 via the selector 24. A search driving generator 33 generates a search driving signal for moving the condensing lens 13 vertically in order to measure an amplitude of the FE signal and a level of the AS signal and sends the signal to the focus actuator 14 via the selector 24.

The FE amplitude measuring device 30 measures the largest value and the smallest value of the FE signal from the FE signal generator while the condensing lens 13 is being moved by the search driving signal from the search driving generator 33. In this way, the amplitude of the FE signal from the FE generator 20 is measured and the measured value is sent to the gain operator 32. The AS level measuring device 31 measures the largest value of the signal from the AS generator 21 while the condensing lens 13 is being moved by the search driving signal from the search driving generator 33. In this way, the level of the AS signal is measured, and the measured value is sent to the gain operator 32.

The gain operator 32 multiplies a preset FE target amplitude by the measured value from the AS level measuring device 31, and then divides the result by the measured value from the FE amplitude measuring device 30. In this way, the gain value is obtained. The gain value is set as an internal gain of the normalization operator 22.

Conventionally, there have been some types of optical discs which include a plurality of information surfaces. For example, some DVDs have one layer and others have two layers. If the optical disc 1 includes a plurality of information surfaces, when the condensing lens 13 is moved vertically for search, an FE signal and an AS signal are generated for each of the information surfaces as shown in FIG. 10. The reflectances of two information surfaces are different. Thus, there are variances in the amplitudes of the generated FE signal and the level of the AS signal between the information surfaces. These variances correspond to the reflectances of the information surfaces. For an information surface with a high reflectance, both the amplitude of the FE signal and the level of the AS signal are large (see, for example, left-hand sides of FIG. 10). For an information surface with a low reflectance, both the amplitude of the FE signal and the level of the AS signal are small (see, for example, right-hand sides of FIG. 10).

Even on the same information surface, reflectance varies depending upon the radial position of the optical disc 1. Furthermore, even the reflectance of the information surface material itself is uniform, the reflectance become different between a recorded portion and an unrecorded portion thereof. For example, as shown in FIGS. 11a) and 11b), the amplitude property of the FE signal and the level property of the AS signal in the unrecorded state may be as represented by solid lines, but they may change into the amplitude property of the FE signal and the level property of the AS signal as represented by broken lines in the recorded state. This is because, when the information surface is recorded, the state of the film forming the information surface changes, causing the reflectance to change.

When the focus control is working with respect to the information surface, if the control gain varies for different parts of the information surfaces, the focus control may be instable. Thus, a method which enables keeping the control gain constant is desired. For example, in the optical disc apparatus shown in FIG. 9, the normalization operator 22 uses the AS signal to normalize the FE signal. Thus, the normalized FE signal which does not depend upon the reflectance change as shown in FIG. 11(c) can be obtained.

For obtaining the normalized FE signal, the normalization operator 22 divides the signal from the FE generator 20 by the signal from the AS generator 21, and then multiply the result by the internal gain. The FE signal from the FE generator 20 is normalized to a signal having a target amplitude with the internal gain of the normalization operator 22. In this way, the control gain of the focus control becomes a predetermined gain that is kept constant.

For obtaining the internal gain of the normalization operator 22, the amplitude of the FE signal from the FE generator 20 and the level of the AS signal from the AS generator 21 have to be measured. For this measurement, in the optical disc apparatus shown in FIG. 9, first the focus control is kept to be in a non-operational state, and a driving signal for moving the condensing lens 13 vertically for search is generated from the search driving generator 33 to operate the condensing lens 13 such that the focus of the optical beam passes through the information surface of the optical disc 1. At this time, the signals as shown in FIG. 10 are output from the FE generator 20 and the AS generator 21 depending upon the relative positions of the focus of the optical beam and the optical disc 1. The FE amplitude measuring device 30 finds the amplitude of the FE signal by measuring the largest value and the smallest value of the FE signal from the FE signal generator 20. The AS level measuring device 31 finds out the level of the AS signal by measuring the largest value of the AS signal from the AS generator 21. For example, for both the amplitude of the FE signal and the level of the AS signal, the values acquired from the information surface with a large reflectance (see, for example, the left-hand sides of FIG. 10) are used for the measurement. Based on the amplitude of the FE signal and the level of the AS signal measured as such, the gain operator 32 calculates the internal gain of the normalization operator 22 (see, for example, Prior Art Reference 1)

[Prior Art Reference 1] Japanese Laid-Open Publication No. 2002-373431

DISCLOSURE OF THE INVENTION

Problems to be Solved by the Invention

As the density of the optical disc 1 increases, the numerical aperture (NA) of the optical beam condensed by the condensing lens 13 tends to increase. As the numerical aperture increases, spherical aberration, which is generated due to a material thickness between the surface of the optical disc 1 and the information surface, increases. When the optical disc 1 has a single layer, the condensing lens 13 can be designed to compensate for the spherical aberration. However, when the optical disc 1 has a plurality of information surfaces, the material thickness from the surface varies depending upon the information surface for which focus control is working. The spherical aberration which may be generated by the variance in the material thickness can be too large to be ignored. For example, an element which modifies the spherical aberration has to be incorporated into the optical head 10 in order to optimize the spherical aberration for each of the information surfaces.

Due to an influence of the spherical aberration, the FE signal from the FE generator 20 and the AS signal from the AS generator 21 deteriorate. A degree of deterioration of the AS signal is smaller than that of the FE signal. This is considered to be because the AS signal simply represents an amount of reflected light. The FE signal from the FE generator 20 and the AS signal from the AS generator 21 which are generated when the condensing lens 13 is moved vertically for search vary depending upon the set amount of spherical aberration. Thus, even when the measurement using the values obtained from the information surface with a large reflectance is tried to be performed as in the focus control gain adjustment method in the optical disc apparatus shown in FIG. 9, it cannot be guaranteed that the measured FE signal amplitude and AS signal level are the measured values from the same information surface. This is because the FE signal from the FE generator 20 is deteriorated unless the spherical aberration is set for the information surface.

As described above, in the optical disc 1 which is largely influenced by spherical aberration, the gain of the focus control may vary and the control may become unstable if the FE signal from the FE generator 20 and the AS signal from the AS generator 21 cannot be measured accurately.

The present invention is to solve the above-described problems, and object thereof is to provide an optical disc apparatus and a semiconductor device which precisely calculates a gain for focus control.

Means for Solving the Problems

An optical disc apparatus of the first invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit when the focus control unit is not working; a focus pull-in unit for operating the focus control unit with respect to the one information surface on which the spherical aberration setting unit is operated; an after-pull-in light amount measurement unit for measuring a level of the signal from the light amount detection unit when the focus of the optical beam is positioned on the one information surface by the focus pull-in unit; and a gain calculation unit for calculating a gain based on amplitude information from the amplitude measurement unit and light amount information from the after-pull-in light amount measurement unit and setting the gain as the internal gain of the focus error normalization unit.

Herein, the information carrier may be, for example, an optical disc such as DVD, BD, or the like (the same is also true throughout this section). The information surface is formed of a material film which allow optical recording or reproduction of information in the information carrier and a single layer or a plurality of layers are formed in the information carrier (the same is also true throughout this section). The term "focus control unit is not working" means that the optical beam is not following on a specific information surface, and the term "focus control is working" means that the optical beam is following on a specific information surface (the same is also true throughout this section).

The optical disc apparatus of the second invention is the first invention which further includes: a recording state detection unit for detecting whether a position irradiated by the optical beam on the information surface of the information carrier is in a recorded state or in an unrecorded state; and a light amount measurement compensation unit for compensating a signal measured by the after-pull-in light amount measurement unit based on information obtained from the recording state detection unit when the amplitude measurement unit measures and information obtained from the recording state detection unit when the after-pull-in light amount measurement unit measures.

The optical disc apparatus of the third invention is the first invention which further includes: a recording state detection unit for detecting whether a position irradiated by the optical beam on the information surface of the information carrier is in a recorded state or in an unrecorded state; an unrecorded amplitude estimation unit for estimating the amplitude of the signal from the focus error detection unit when the information carrier is in the unrecorded state based on information obtained from the recording state detection unit when the amplitude measurement unit measures and the signal measured by the amplitude measurement unit; and an unrecorded light amount estimation unit for estimating a signal level from the light amount detection unit when the information carrier is in the unrecorded state based on information obtained from the recording state detection unit when the after-pull-in light amount measurement unit measures and the signal measured by the after-pull-in light amount measurement unit.

The optical disc apparatus of the fourth invention is the first invention which further includes: a recording state detection unit for detecting whether a position irradiated by the optical beam on the information surface of the information carrier is in a recorded state or in an unrecorded state; a recorded amplitude estimation unit for estimating the amplitude of the signal from the focus error detection unit when the information carrier is in the recorded state based on information obtained from the recording state detection unit when the amplitude measurement unit measures and the signal measured by the amplitude measurement unit; and a recorded light amount estimation unit for estimating a signal level from the light amount detection unit when the information carrier is in the recorded state based on information obtained from the recording state detection unit when the after-pull-in light amount measurement unit measures and the signal measured by the after-pull-in light amount measurement unit.

The optical disc apparatus of the fifth invention is the first invention which further includes a layer detection unit for detecting whether the focus of the optical beam is positioned on the one information surface on which the spherical aberration setting unit is operated or not, in which the focus pull-in unit performs a pull-in operation when the layer detection unit detects that the optical beam is not positioned on the one information surface on which the spherical aberration setting unit is operated.

The optical disc apparatus of the sixth invention is the fifth invention which further includes a track error detection unit for detecting a signal which corresponds to a shift in a position between the optical beam and a track on the information carrier, in which the layer detection unit performs the detection based on an amplitude of the signal from the track error detection unit.

The optical disc apparatus of the seventh invention is the fifth invention which further includes a spherical aberration adjustment unit for adjusting a spherical aberration of the optical beam into an optimum state for the information surface when the focus control unit is working, in which the layer detection unit performs the detection based on an optimal spherical aberration amount obtained by the spherical aberration adjustment unit.

The optical disc apparatus of the eighth invention is the first invention in which the spherical aberration setting unit includes a memory for storing a spherical aberration amount set for each of the information surfaces of the information carrier.

The optical disc apparatus of the ninth invention is the first invention which further includes a fixed gain setting unit for setting a gain corresponding to an expected reflectance value of the information carrier as an initial internal gain value of the focus error normalization unit before the focus control is pulled in.

The optical disc apparatus of the tenth invention is the first invention which further includes a before-pull-in gain setting unit for calculating a gain based on a measured value from the amplitude measurement unit and setting the gain as an initial internal gain value of the focus error normalization unit before the focus control is pulled in.

An optical disc apparatus of the eleventh invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit when the focus control unit is not working; a maximum light amount detection unit for detecting a signal level at a maximum point of a signal from the light amount detection unit when the focus control unit is not working; a light amount measurement selection unit for selecting the maximum point detected by the maximum light amount detection unit when the optical beam passes near the one information surface on which the spherical aberration setting unit is operated; and a gain calculation unit for calculating a gain based on amplitude information from the amplitude measurement unit and light amount information from the light amount measurement selection unit and setting the gain as the internal gain of the focus error normalization unit.

The optical disc apparatus of the twelfth invention is the eleventh invention which further includes a largest and smallest timing detection unit for detecting a timing at which the signal from the focus error detection unit becomes the largest and a timing at which the signal from the focus error detection unit becomes the smallest, in which the light amount measurement selection unit selects a signal level measured by the maximum light amount detection unit between the two timings obtained from the largest and smallest timing detection unit.

The optical disc apparatus of the thirteenth invention is the eleventh invention which further includes an amplitude timing detection unit for detecting a timing at which the number of amplitudes of the signal from the focus error detection unit reaches the number of the information surfaces up to the one information surface on which the spherical aberration setting unit is operated, in which the light amount measurement selection unit selects a signal level measured by the maximum light amount detection unit at a timing closest to the timing detected by the amplitude number timing detection unit.

Herein, the information surface number is counted as follows. When the signal from the focus error detection unit is obtained while the focus position of the optical beam is moving along an axial direction of the information carrier, the information surface number is the number of the information surfaces up to the information surface which is a subject of counting when counted from the side from which the focus position starts to move. More specifically, when the focus error is detected with the focus position being moved from the side irradiated by the optical beam to the other side, the information surface number of the information surface closest to the side irradiated by the optical beam is "1", and the information number is incremented toward the other side.

The optical disc apparatus of the fourteenth invention is the eleventh invention which further includes a light amount maximum number timing detection unit for detecting a timing at which the number of maximums of the signal from the light amount detection unit reaches the number of the information surfaces up to the one information surface on which the spherical aberration setting unit is operated, in which the light amount measurement selection unit selects a signal level measured by the maximum light amount detection unit at a timing closest to the timing at which the light amount maximum number timing detection unit detects.

An optical disc apparatus of the fifteenth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for an information surface closest to the surface of the information carrier when the focus control unit is not working; an amplitude measurement unit for measuring an amplitude of the signal from the focus error detection unit when the focus control unit is not working; a maximum light amount detection unit for detecting a signal level at a maximum point of a signal from the light amount detection unit when the focus control unit is not working; a first light amount measurement selection unit for selecting a signal level at a first maximum point detected by the maximum light amount detection unit when the focus control unit is not working; and a gain calculation unit for calculating a gain based on a signal from the amplitude measurement unit and a signal from the first light amount measurement selection unit and setting the gain as the internal gain of the focus error normalization unit.

Herein, the surface of the information carrier may be, for example, a surface of the information carrier, which is on the side from which the focus position of the optical beam starts to move when it is moved along the axial direction of the information surface. More specifically, the surface refers to a surface of the side irradiated by the optical beam when the focus error is detected with the focus position being moved from the side irradiated by the optical beam toward the further side. The term "first" means the "first" within a movement process for moving the focus position of the optical beam along the axial direction of the information carrier, and the term "last" means the "last" within the movement process for moving the focus position of the optical beam along the axial direction of the information carrier.

An optical disc apparatus of the sixteenth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for an information surface furthest from the surface of the information carrier when the focus control unit is not working; an amplitude measurement unit for measuring an amplitude of the signal from the focus error detection unit when the focus control unit is not working; a maximum light amount detection unit for detecting a signal level at a maximum point of the signal from the light amount detection unit when the focus control unit is not working; a last light amount measurement selection unit for selecting a signal level at a last maximum point detected by the maximum light amount detection unit when the focus control unit is not working; and a gain calculation unit for calculating a gain based on a signal from the amplitude measurement unit and a signal from the last light amount measurement selection unit and setting the gain as the internal gain of the focus error normalization unit.

An optical disc apparatus of the seventeenth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration adjustment unit for adjusting a spherical aberration so as to be optimum for an information surface to be a target of the focus control when the focus control unit is working; an amplitude measurement unit for measuring an amplitude of the signal from the focus error detection unit after the adjustment by the spherical aberration adjustment unit; a light amount measurement unit for measuring a level of the signal from the light amount detection unit after the adjustment by the spherical aberration adjustment unit; and a gain calculation unit for calculating a gain based on amplitude information from the amplitude measurement unit and light amount information from the light amount measurement unit and setting the gain as the internal gain of the focus error normalization unit.

An optical disc apparatus of the eighteenth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit; a focus pull-in unit for operating the focus control unit with respect to the one information surface on which the spherical aberration setting unit is operated; a light amount measurement unit for measuring a level of the signal from the light amount detection unit; a gain calculation unit for calculating a gain based on amplitude information from the amplitude measurement unit and light amount information from an after-pull-in light amount measurement unit and setting the gain as the internal gain of the focus error normalization unit; a spherical aberration adjustment unit for adjusting a spherical aberration so as to be optimum for an information surface to be a target of the focus control when the focus control unit is working; a gain compensation unit for compensating the internal gain of the focus error normalization unit depending upon a spherical aberration amount adjusted by the spherical aberration adjustment unit.

An optical disc apparatus of the nineteenth invention is any of the first, eleventh, and fifteenth through eighteenth inventions which further includes a layer-depending gain switching unit which has internal gain candidates set for each of the information surfaces of the information carrier and switches among the internal gain candidates in accordance with the information surface which is a target of the focus control to output an internal gain candidate, in which an output of the gain calculation unit is set for all of the internal gain candidates of the layer-depending gain switching unit.

A semiconductor device of the twentieth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit when the focus control unit is not working; a focus pull-in unit for operating the focus control unit with respect to the one information surface on which the spherical aberration setting unit is operated; an after-pull-in light amount measurement unit for measuring a level of the signal from the light amount detection unit when the focus of the optical beam is positioned on the one information surface by the focus pull-in unit; and a gain calculation unit for calculating a gain based on amplitude information from the amplitude measurement unit and light amount information from the after-pull-in light amount measurement unit and setting the gain as the internal gain of the focus error normalization unit.

The semiconductor device of the twenty-first invention is the twentieth invention which further includes: a recording state detection unit for detecting whether a position irradiated by the optical beam on the information surface of the information carrier is in a recorded state or in an unrecorded state; and a light amount compensation measurement unit for compensating a signal measured by the after-pull-in light amount measurement unit based on information obtained from the recording state detection unit when the amplitude measurement unit measures and information obtained from the recording state detection unit when the after-pull-in light amount measurement unit measures.

The semiconductor device of the twenty-second invention is the twentieth invention which further includes: a recording state detection unit for detecting whether a position irradiated by the optical beam on the information surface of the information carrier is in a recorded state or in an unrecorded state; an unrecorded amplitude estimation unit for estimating the amplitude of the signal from the focus error detection unit when the information carrier is in the unrecorded state based on information obtained from the recording state detection unit when the amplitude measurement unit measures and the signal measured by the amplitude measurement unit; and an unrecorded light amount estimation unit for estimating a signal level from the light amount detection unit when the information carrier is in the unrecorded state based on information obtained from the recording state detection unit when the after-pull-in light amount measurement unit measures and the signal measured by the after-pull-in light amount measurement unit.

The semiconductor device of the twenty-third invention is the twentieth invention which further includes: a recording state detection unit for detecting whether a position irradiated by the optical beam on the information surface of the information carrier is in a recorded state or in an unrecorded state; a recorded amplitude estimation unit for estimating the amplitude of the signal from the focus error detection unit when the information carrier is in the recorded state based on information obtained from the recording state detection unit when the amplitude measurement unit measures and the signal measured by the amplitude measurement unit; and a recorded light amount estimation unit for estimating a signal level from the light amount detection unit when the information carrier is in the recorded state based on information obtained from the recording state detection unit when the after-pull-in light amount measurement unit measures and the signal measured by the after-pull-in light amount measurement unit.

The semiconductor device is the twenty-fourth invention is the twentieth invention which further includes a layer detection unit for detecting whether the focus of the optical beam is positioned on the one information surface on which the spherical aberration setting unit is operated or not, in which the focus pull-in unit performs a pull-in operation when the layer detection unit detects that the optical beam is not positioned on the one information surface on which the spherical aberration setting unit is operated.

The semiconductor device of the twenty-fifth invention is the twenty-fourth invention which further includes a track error detection unit for detecting a signal which corresponds to a shift in a position between the optical beam and a track on the information carrier, in which the layer detection unit performs the detection based on an amplitude of the signal from the track error detection unit.

The semiconductor device of the twenty-sixth invention is the twenty-fourth invention which further includes a spherical aberration adjustment unit for adjusting a spherical aberration of the optical beam into an optimum state for the information surface when the focus control unit is working, in which the layer detection unit performs the detection based on an optimal spherical aberration amount obtained by the spherical aberration adjustment unit.

The semiconductor device of the twenty-seventh invention is the twentieth invention in which the spherical aberration setting unit includes a memory for storing a spherical aberration amount set for each of the information surfaces of the information carrier.

The semiconductor device of the twenty-eighth invention is the twentieth invention which further includes a fixed gain setting unit for setting a gain corresponding to an expected reflectance value of the information carrier as an initial internal gain value of the focus error normalization unit before the focus control is pulled in.

The semiconductor device of the twenty-ninth invention is the twentieth invention which further includes a before-pull-in gain setting unit for calculating a gain based on a measured value from the amplitude measurement unit and setting the gain as an initial internal gain value of the focus error normalization unit before the focus control is pulled in.

A semiconductor device of the thirtieth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit when the focus control unit is not working; a maximum light amount detection unit for detecting a signal level at a maximum point of a signal from the light amount detection unit when the focus control unit is not working; a light amount measurement selection unit for selecting the maximum point detected by the maximum light amount detection unit when the optical beam passes near the one information surface on which the spherical aberration setting unit is operated; and a gain calculation unit for calculating a gain based on amplitude information from the amplitude measurement unit and light amount information from the light amount measurement selection unit and setting the gain as the internal gain of the focus error normalization unit.

The semiconductor device of the thirty-first invention is the thirtieth invention which further includes a largest and smallest timing detection unit for detecting a timing at which the signal from the focus error detection unit becomes the largest and a timing at which the signal from the focus error detection unit becomes the smallest, in which the light amount measurement selection unit selects a signal level measured by the maximum light amount detection unit between the two timings obtained from the largest and smallest timing detection unit.

The semiconductor device of the thirty-second invention is the thirtieth invention which further includes an amplitude timing detection unit for detecting a timing at which the number of amplitudes of the signal from the focus error detection unit reaches the number of the information surfaces up to the one information surface on which the spherical aberration setting unit is operated, in which the light amount measurement selection unit selects a signal level measured by the maximum light amount detection unit at a timing closest to the timing detected by the amplitude number timing detection unit.

The semiconductor device of the thirty-third invention is the thirtieth invention which further includes a light amount maximum number timing detection unit for detecting a timing at which the number of maximums of the signal from the light amount detection unit reaches the number of information surfaces up to the one information surface on which the spherical aberration setting unit is operated, in which the light amount measurement selection unit selects a signal level measured by the maximum light amount detection unit at a timing closest to the timing at which the light amount maximum number timing detection unit detects.

A semiconductor device of the thirty-fourth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for an information surface closest to the surface of the information carrier when the focus control unit is not working; an amplitude measurement unit for measuring an amplitude of the signal from the focus error detection unit when the focus control unit is not working; a maximum light amount detection unit for detecting a signal level at a maximum point of the signal from the light amount detection unit when the focus control unit is not working; a first light amount measurement selection unit for selecting a signal level at a first maximum point detected by the maximum light amount detection unit when the focus control unit is not working; and a gain calculation unit for calculating a gain based on a signal from the amplitude measurement unit and a signal from the first light amount measurement selection unit and setting the gain as the internal gain of the focus error normalization unit.

A semiconductor device of the thirty-fifth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for an information surface furthest from the surface of the information carrier when the focus control unit is not working; an amplitude measurement unit for measuring an amplitude of the signal from the focus error detection unit when the focus control unit is not working; a maximum light amount detection unit for detecting a signal level at a maximum point of the signal from the light amount detection unit when the focus control unit is not working; a last light amount measurement selection unit for selecting a signal level at a last maximum point detected by the maximum light amount detection unit when the focus control unit is not working; and a gain calculation unit for calculating a gain based on a signal from the amplitude measurement unit and a signal from the last light amount measurement selection unit and setting the gain as the internal gain of the focus error normalization unit.

A semiconductor device of the thirty-sixth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration adjustment unit for adjusting a spherical aberration so as to be optimum for an information surface to be a target of the focus control when the focus control unit is working; an amplitude measurement unit for measuring an amplitude of the signal from the focus error detection unit after the adjustment by the spherical aberration adjustment unit; a light amount measurement unit for measuring a level of the signal from the light amount detection unit after the adjustment by the spherical aberration adjustment unit; and a gain calculation unit for calculating a gain based on amplitude information from the amplitude measurement unit and light amount information from the light amount measurement unit and setting the gain as the internal gain of the focus error normalization unit.

A semiconductor device of the thirty-seventh invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit; a focus pull-in unit for operating the focus control unit with respect to the one information surface on which the spherical aberration setting unit is operated; a light amount measurement unit for measuring a level of the signal from the light amount detection unit; a gain calculation unit for calculating a gain based on amplitude information from the amplitude measurement unit and light amount information from an after-pull-in light amount measurement unit and setting the gain as the internal gain of the focus error normalization unit; a spherical aberration adjustment unit for adjusting a spherical aberration so as to be optimum for an information surface to be a target of the focus control when the focus control unit is working; a gain compensation unit for compensating the internal gain of the focus error normalization unit depending upon a spherical aberration amount adjusted by the spherical aberration adjustment unit.

A semiconductor device of the thirty-eighth invention is any of the twentieth, thirtieth, and thirty-fourth through thirty-seventh inventions which further includes a layer-depending gain switching unit which has internal gain candidates set for each of the information surfaces of the information carrier and switches among the internal gain candidates in accordance with the information surface which is a target of the focus control to output an internal gain candidate, in which an output of the gain calculation unit is set for all of the internal gain candidates of the layer-depending gain switching unit.

EFFECT OF THE INVENTION

An optical disc apparatus of the first invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit when the focus control unit is not working; a focus pull-in unit for operating the focus control unit with respect to the one information surface on which the spherical aberration setting unit is operated; an after-pull-in light amount measurement unit for measuring a level of the signal from the light amount detection unit when the focus of the optical beam is positioned on the one information surface by the focus pull-in unit; and a gain calculation unit for calculating a gain based on amplitude information from the amplitude measurement unit and light amount information from the after-pull-in light amount measurement unit and setting the gain as the internal gain of the focus error normalization unit.

According to such a structure, even when the FE signal of the information surface with a large reflectance (the signal detected by the focus error detection unit) deteriorates due to an influence of the spherical aberration, the gain is calculated using, for example, the signal obtained from the information surface for which the spherical aberration is adapted. Thus, a variance in the gain of the focus control can be suppressed.

The optical disc apparatus of the second invention is the first invention which further includes: a recording state detection unit for detecting whether a point irradiated by the optical beam on the information surface of the information carrier is in a recorded state or in an unrecorded state; and a light amount measurement compensation unit for compensating a signal measured by the after-pull-in light amount measurement unit based on information obtained from the recording state detection unit when the amplitude measurement unit measures and information obtained from the recording state detection unit when the after-pull-in light amount measurement unit measures.

According to such a structure, even when the recorded/ unrecorded state of an area on the information surface which is measured differs between when the FE signal is measured and when an AS signal (signal detected by the light amount detection unit) is measured, the variance in the gain of the focus control can be suppressed.

The optical disc apparatus of the third invention is the first invention which further includes: a recording state detection unit for detecting whether a position irradiated by the optical beam on the information surface of the information carrier is in a recorded state or in an unrecorded state; an unrecorded amplitude estimation unit for estimating the amplitude of the signal from the focus error detection unit when the information carrier is in the unrecorded state based on information obtained from the recording state detection unit when the amplitude measurement unit measures and the signal measured by the amplitude measurement unit; and an unrecorded light amount estimation unit for estimating a signal level from the light amount detection unit when the information carrier is in the unrecorded state based on information obtained from the recording state detection unit when the after-pull-in light amount measurement unit measures and the signal measured by the after-pull-in light amount measurement unit.

According to such a structure, even when the recorded/ unrecorded state of an area on the information surface which is measured differs between when the FE signal is measured and when the AS signal is measured, the variance in the gain of the focus control can be suppressed.

The optical disc apparatus of the fourth invention is the first invention which further includes: a recording state detection unit for detecting whether a position irradiated by the optical beam on the information surface of the information carrier is in a recorded state or in an unrecorded state; a recorded amplitude estimation unit for estimating the amplitude of the signal from the focus error detection unit when the information carrier is in the recorded state based on information obtained from the recording state detection unit when the amplitude measurement unit measures and the signal measured by the amplitude measurement unit; and a recorded light amount estimation unit for estimating a signal level from the light amount detection unit when the information carrier is in the recorded state based on information obtained from the recording state detection unit when the after-pull-in light amount measurement unit measures and the signal measured by the after-pull-in light amount measurement unit.

According to such a structure, even when the recorded/ unrecorded state of an area on the information surface which is measured differs between when the FE signal is measured and when the AS signal is measured, the variance in the gain of the focus control can be suppressed.

The optical disc apparatus of the fifth invention is the first invention which further includes a layer detection unit for detecting whether the focus of the optical beam is positioned on the one information surface on which the spherical aberration setting unit is operated or not, in which the focus pull-in unit performs a pull-in operation when the layer detection unit detects that the optical beam is not positioned on the one information surface on which the spherical aberration setting unit is operated.

According to such a structure, even when the focus is erroneously pulled in to an information surface for which the spherical aberration is not adapted (erroneous pull-in of focus), the pull-in of the focus can be started over, so that the variance in the gain of the focus control can be suppressed.

The optical disc apparatus of the sixth invention is the fifth invention which further includes a track error detection unit for detecting a signal which corresponds to a shift in a position between the optical beam and a track on the information carrier, in which the layer detection unit performs the detection based on an amplitude of the signal from the track error detection unit.

According to such a structure, an information surface to which the focus is pulled in can be determined.

The optical disc apparatus of the seventh invention is the fifth invention which further includes a spherical aberration adjustment unit for adjusting a spherical aberration of the optical beam into an optimum state for the information surface when the focus control unit is working, in which the layer detection unit performs the detection based on an optimal spherical aberration amount obtained by the spherical aberration adjustment unit.

According to such a structure, an information surface to which the focus is pulled in can be determined.

The optical disc apparatus of the eighth invention is the first invention in which the spherical aberration setting unit includes a memory for storing a spherical aberration amount set for each of the information surfaces of the information carrier.

According to such a structure, it becomes possible to appropriately set the gain of the focus control with the spherical aberration being adapted for a desired information surface. Thus, the change in the gain before and after the spherical aberration adjustment can be suppressed.

The optical disc apparatus of the ninth invention is the first invention which further includes a fixed gain setting unit for setting a gain corresponding to an expected reflectance value of the information carrier as an initial internal gain value of the focus error normalization unit before the focus control is pulled in.

According to such a structure, it becomes possible to start focus pull-in using the appropriate initial internal gain value. Thus, the stability of pull-in when the focus control is pulled in can be improved.

The optical disc apparatus of the tenth invention is the first invention which further includes a before-pull-in gain setting unit for calculating a gain based on a measured value from the amplitude measurement unit and setting the gain as an initial internal gain value of the focus error normalization unit before the focus control is pulled in.

According to such a structure, it becomes possible to start focus pull-in using the appropriate initial internal gain value. Thus, the stability of pull-in when the focus control is pulled in can be improved.

An optical disc apparatus of the eleventh invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit when the focus control unit is not working; a maximum light amount detection unit for detecting a signal level at a maximum point of the signal from the light amount detection unit when the focus control unit is not working; a light amount measurement selection unit for selecting the maximum point detected by the maximum light amount detection unit when the optical beam passes near the one information surface on which the spherical aberration setting unit is operated; and a gain calculation unit for calculating a gain based on amplitude information from the amplitude measurement unit and light amount information from the light amount measurement selection unit and setting the gain as the internal gain of the focus error normalization unit.

According to such a structure, even when the FE signal of the information surface with the large reflectance deteriorates due to the influence of the spherical aberration, the gain is calculated using, for example, the signal obtained from the information surface for which the spherical aberration is adapted. Thus, the variance in the gain of the focus control can be suppressed.

The optical disc apparatus of the twelfth invention is the eleventh invention which further includes a largest and smallest timing detection unit for detecting a timing at which the signal from the focus error detection unit becomes the largest and a timing at which the signal from the focus error detection unit becomes the smallest, in which the light amount measurement selection unit selects a signal level measured by the maximum light amount detection unit between the two timings obtained from the largest and smallest timing detection unit.

According to such a structure, it becomes possible to obtain a timing at which the optical beam passes the information surface for which the spherical aberration is adapted. Thus, the gain can be calculated using the signal obtained from the information surface for which the spherical aberration is adapted.

The optical disc apparatus of the thirteenth invention is the eleventh invention which further includes an amplitude timing detection unit for detecting a timing at which the number of amplitudes of the signal from the focus error detection unit reaches the number of the information surfaces up to the one information surface on which the spherical aberration setting unit is operated, in which the light amount measurement selection unit selects a signal level measured by the maximum light amount detection unit at a timing closest to the timing detected by the amplitude number timing detection unit.

According to such a structure, it becomes possible to obtain a timing at which the optical beam passes the information surface for which the spherical aberration is adapted. Thus, the gain can be calculated using the signal obtained from the information surface for which the spherical aberration is adapted.

The optical disc apparatus of the fourteenth invention is the eleventh invention which further includes a light amount maximum number timing detection unit for detecting a timing at which the number of maximums of the signal from the light amount detection unit reaches the number of the information surfaces up to the one information surface on which the spherical aberration setting unit is operated, in which the light amount measurement selection unit selects a signal level measured by the maximum light amount detection unit at a timing closest to the timing at which the light amount maximum number timing detection unit detects.

According to such a structure, it becomes possible to obtain a timing at which the optical beam passes the information surface for which the spherical aberration is adapted. Thus, the gain can be calculated using the signal obtained from the information surface for which the spherical aberration is adapted.

An optical disc apparatus of the fifteenth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for an information surface closest to the surface of the information carrier when the focus control unit is not working; an amplitude measurement unit for measuring an amplitude of the signal from the focus error detection unit when the focus control unit is not working; a maximum light amount detection unit for detecting a signal level at a maximum point of a signal from the light amount detection unit when the focus control unit is not working; a first light amount measurement selection unit for selecting a signal level at a first maximum point detected by the maximum light amount detection unit when the focus control unit is not working; and a gain calculation unit for calculating a gain based on a signal from the amplitude measurement unit and a signal from the first light amount measurement selection unit and setting the gain as the internal gain of the focus error normalization unit.

According to such a structure, even when the FE signal of the information surface with the large reflectance deteriorates due to the influence of the spherical aberration, the gain is calculated using, for example, the signal obtained from the information surface for which the spherical aberration is adapted. Thus, a variance in the gain of the focus control can be suppressed.

An optical disc apparatus of the sixteenth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for an information surface furthest from the surface of the information carrier when the focus control unit is not working; an amplitude measurement unit for measuring an amplitude of the signal from the focus error detection unit when the focus control unit is not working; a maximum light amount detection unit for detecting a signal level at a maximum point of a signal from the light amount detection unit when the focus control unit is not working; a last light amount measurement selection unit for selecting a signal level at a last maximum point detected by the maximum light amount detection unit when the focus control unit is not working; and a gain calculation unit for calculating a gain based on a signal from the amplitude measurement unit and a signal from the last light amount measurement selection unit and setting the gain as the internal gain of the focus error normalization unit.

According to such a structure, even when the FE signal of the information surface with the large reflectance deteriorates due to the influence of the spherical aberration, the gain is calculated using, for example, the signal obtained from the information surface for which the spherical aberration is adapted. Thus, a variance in the gain of the focus control can be suppressed.

An optical disc apparatus of the seventeenth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration adjustment unit for adjusting a spherical aberration so as to be optimum for an information surface to be a target of the focus control when the focus control unit is working; an amplitude measurement unit for measuring an amplitude of the signal from the focus error detection unit after the adjustment by the spherical aberration adjustment unit; a light amount measurement unit for measuring a level of the signal from the light amount detection unit after the adjustment by the spherical aberration adjustment unit; and a gain calculation unit for calculating a gain based on amplitude information from the amplitude measurement unit and light amount information from the light amount measurement unit and setting the gain as the internal gain of the focus error normalization unit.

According to such a structure, even when the FE signal deteriorates due to the influence of the spherical aberration, the gain is calculated using the signal obtained from the information surface after the spherical aberration is adjusted. Thus, a variance in the gain of the focus control can be suppressed.

An optical disc apparatus of the eighteenth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit; a focus pull-in unit for operating the focus control unit with respect to the one information surface on which the spherical aberration setting unit is operated; a light amount measurement unit for measuring a level of the signal from the light amount detection unit; a gain calculation unit for calculating a gain based on amplitude information from the amplitude measurement unit and light amount information from an after-pull-in light amount measurement unit and setting the gain as the internal gain of the focus error normalization unit; a spherical aberration adjustment unit for adjusting a spherical aberration so as to be optimum for an information surface to be a target of the focus control when the focus control unit is working; a gain compensation unit for compensating the internal gain of the focus error normalization unit depending upon a spherical aberration amount adjusted by the spherical aberration adjustment unit.

According to such a structure, even when the FE signal deteriorates due to the influence of the spherical aberration, the spherical aberration is adjusted, and further, the gain is compensated based on the adjusted spherical aberration. Thus, a variance in the gain of the focus control can be suppressed.

The optical disc apparatus of the nineteenth invention is any of the first, eleventh, and fifteenth through eighteenth inventions which further includes a layer-depending gain switching unit which has internal gain candidates set for each of the information surfaces of the information carrier and switches among the internal gain candidates in accordance with the information surface which is a target of the focus control to output an internal gain candidate, in which an output of the gain calculation unit is set for all of the internal gain candidates of the layer-depending gain switching unit.

According to such a structure, the first focus jump landing after a startup can be stabilized.

A semiconductor device of the twentieth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit when the focus control unit is not working; a focus pull-in unit for operating the focus control unit with respect to the one information surface on which the spherical aberration setting unit is operated; an after-pull-in light amount measurement unit for measuring a level of the signal from the light amount detection unit when the focus of the optical beam is positioned on the one information surface by the focus pull-in unit; and a gain calculation unit for calculating a gain based on amplitude information from the amplitude measurement unit and light amount information from the after-pull-in light amount measurement unit and setting the gain as the internal gain of the focus error normalization unit.

According to such a structure, even when the FE signal of the information surface with the large reflectance deteriorates due to the influence of the spherical aberration, the gain is calculated using, for example, the signal obtained from the information surface for which the spherical aberration is adapted. Thus, a variance in the gain of the focus control can be suppressed.

The semiconductor device of the twenty-first invention is the twentieth invention which further includes: a recording state detection unit for detecting whether a position irradiated by the optical beam on the information surface of the information carrier is in a recorded state or in an unrecorded state; and a light amount compensation measurement unit for compensating a signal measured by the after-pull-in light amount measurement unit based on information obtained from the recording state detection unit when the amplitude measurement unit measures and information obtained from the recording state detection unit when the after-pull-in light amount measurement unit measures.

According to such a structure, even when the recorded/unrecorded state of an area on the information surface which is measured differs between when the FE signal is measured and when the AS signal is measured, the variance in the gain of the focus control can be suppressed.

The semiconductor device of the twenty-second invention is the twentieth invention which further includes: a recording state detection unit for detecting whether a position irradiated by the optical beam on the information surface of the information carrier is in a recorded state or in an unrecorded state; an unrecorded amplitude estimation unit for estimating the amplitude of the signal from the focus error detection unit when the information carrier is in the unrecorded state based on information obtained from the recording state detection unit when the amplitude measurement unit measures and the signal measured by the amplitude measurement unit; and an unrecorded light amount estimation unit for estimating a signal level from the light amount detection unit when the information carrier is in the unrecorded state based on information obtained from the recording state detection unit when the after-pull-in light amount measurement unit measures and the signal measured by the after-pull-in light amount measurement unit.

According to such a structure, even when the recorded/unrecorded state of an area on the information surface which is measured differs between when the FE signal is measured and when the AS signal is measured, the variance in the gain of the focus control can be suppressed.

The semiconductor device of the twenty-third invention is the twentieth invention which further includes: a recording state detection unit for detecting whether a position irradiated by the optical beam on the information surface of the information carrier is in a recorded state or in an unrecorded state; a recorded amplitude estimation unit for estimating the amplitude of the signal from the focus error detection unit when the information carrier is in the recorded state based on information obtained from the recording state detection unit when the amplitude measurement unit measures and the signal measured by the amplitude measurement unit; and a recorded light amount estimation unit for estimating a signal level from the light amount detection unit when the information carrier is in the recorded state based on information obtained from the recording state detection unit when the after-pull-in light amount measurement unit measures and the signal measured by the after-pull-in light amount measurement unit.

According to such a structure, even when the recorded/unrecorded state of an area on the information surface which is measured differs between when the FE signal is measured and when the AS signal is measured, the variance in the gain of the focus control can be suppressed.

A semiconductor device is the twenty-fourth invention is the twentieth invention which further includes a layer detection unit for detecting whether the focus of the optical beam is positioned on the one information surface on which the spherical aberration setting unit is operated or not, in which the focus pull-in unit performs a pull-in operation when the layer detection unit detects that the optical beam is not positioned on the one information surface on which the spherical aberration setting unit is operated.

According to such a structure, even when the focus is erroneously pulled in to the information surface for which the spherical aberration is not adapted (erroneous pull-in of focus), the pull-in of the focus can be started over, so that the variance in the gain of the focus control can be suppressed.

The semiconductor device of the twenty-fifth invention is the twenty-fourth invention which further includes a track error detection unit for detecting a signal which corresponds to a shift in a position between the optical beam and a track on the information carrier, in which the layer detection unit performs the detection based on an amplitude of the signal from the track error detection unit.

According to such a structure, the information surface to which the focus is pulled in can be determined.

The semiconductor device of the twenty-sixth invention is the twenty-fourth invention which further includes a spherical aberration adjustment unit for adjusting a spherical aberration of the optical beam into an optimum state for the information surface when the focus control unit is working, in which the layer detection unit performs the detection based on an optimal spherical aberration amount obtained by the spherical aberration adjustment unit.

According to such a structure, the information surface to which the focus is pulled in can be determined.

The semiconductor device of the twenty-seventh invention is the twentieth invention in which the spherical aberration setting unit includes a memory for storing a spherical aberration amount set for each of the information surfaces of the information carrier.

According to such a structure, it becomes possible to appropriately set the gain of the focus control with the spherical aberration being adapted for a desired information surface. Thus, the change in the gain before and after the spherical aberration adjustment can be suppressed.

A semiconductor device of the twenty-eighth invention is the twentieth invention which further includes a fixed gain setting unit for setting a gain corresponding to an expected reflectance value of the information carrier as an initial internal gain value of the focus error normalization unit before the focus control is pulled in.

According to such a structure, it becomes possible to start focus pull-in using the appropriate initial internal gain value. Thus, the stability of pull-in when the focus control is pulled in can be improved.

A semiconductor device of the twenty-ninth invention is the twentieth invention which further includes a before-pull-in gain setting unit for calculating a gain based on a measured value from the amplitude measurement unit and setting the gain as an initial internal gain value of the focus error normalization unit before the focus control is pulled in.

According to such a structure, it becomes possible to start focus pull-in using the appropriate initial internal gain value. Thus, the stability of pull-in when the focus control is pulled in can be improved.

A semiconductor device of the thirtieth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit when the focus control unit is not working; a maximum light amount detection unit for detecting a signal level at a maximum point of a signal from the light amount detection unit when the focus control unit is not working; a light amount measurement selection unit for selecting the maximum point detected by the maximum light amount detection unit when the optical beam passes near the one information surface on which the spherical aberration setting unit is operated; and a gain calculation unit for calculating a gain based on amplitude information from the amplitude measurement unit and light amount information from the light amount measurement selection unit and setting the gain as the internal gain of the focus error normalization unit.

According to such a structure, even when the FE signal of the information surface with the large reflectance deteriorates due to the influence of the spherical aberration, the gain is calculated using, for example, the signal obtained from the information surface for which the spherical aberration is adapted. Thus, the variance in the gain of the focus control can be suppressed.

The semiconductor device of the thirty-first invention is the thirtieth invention which further includes a largest and smallest timing detection unit for detecting a timing at which the signal from the focus error detection unit becomes the largest and a timing at which the signal from the focus error detection unit becomes the smallest, in which the light amount measurement selection unit selects a signal level measured by the maximum light amount detection unit between the two timings obtained from the largest and smallest timing detection unit.

According to such a structure, it becomes possible to obtain a timing at which the optical beam passes the information surface for which the spherical aberration is adapted. Thus, the gain can be calculated using the signal obtained from the information surface for which the spherical aberration is adapted.

The semiconductor device of the thirty-second invention is the thirtieth invention which further includes an amplitude timing detection unit for detecting a timing at which the number of amplitudes of the signal from the focus error detection unit reaches the number of the information surfaces up to the one information surface on which the spherical aberration setting unit is operated, in which the light amount measurement selection unit selects a signal level measured by the maximum light amount detection unit at a timing closest to the timing detected by the amplitude number timing detection unit.

According to such a structure, it becomes possible to obtain the timing at which the optical beam passes the information surface for which the spherical aberration is adapted. Thus, the gain can be calculated using the signal obtained from the information surface for which the spherical aberration is adapted.

A semiconductor device of the thirty-third invention is the thirtieth invention which further includes a light amount maximum number timing detection unit for detecting a timing at which the number of maximums of the signal from the light amount detection unit reaches the number of information surfaces up to the one information surface on which the spherical aberration setting unit is operated, in which the light amount measurement selection unit selects a signal level measured by the maximum light amount detection unit at a timing closest to the timing at which the light amount maximum number timing detection unit detects.

According to such a structure, it becomes possible to obtain a timing at which the optical beam passes the information surface for which the spherical aberration is adapted. Thus, the gain can be calculated using the signal obtained from the information surface for which the spherical aberration is adapted.

A semiconductor device of the thirty-fourth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for an information surface closest to the surface of the information carrier when the focus control unit is not working; an amplitude measurement unit for measuring an amplitude of the signal from the focus error detection unit when the focus control unit is not working; a maximum light amount detection unit for detecting a signal level at a maximum point of a signal from the light amount detection unit when the focus control unit is not working; a first light amount measurement selection unit for selecting a signal level at a first maximum point detected by the maximum light amount detection unit when the focus control unit is not working; and a gain calculation unit for calculating a gain based on a signal from the amplitude measurement unit and a signal from the first light amount measurement selection unit and setting the gain as the internal gain of the focus error normalization unit.

According to such a structure, even when the FE signal of the information surface with the large reflectance deteriorates due to the influence of the spherical aberration, the gain is calculated using, for example, the signal obtained from the information surface for which the spherical aberration is adapted. Thus, the variance in the gain of the focus control can be suppressed.

A semiconductor device of the thirty-fifth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for an information surface furthest from the surface of the information carrier when the focus control unit is not working; an amplitude measurement unit for measuring an amplitude of the signal from the focus error detection unit when the focus control unit is not working; a maximum light amount detection unit for detecting a signal level at a maximum point of the signal from the light amount detection unit when the focus control unit is not working; a last light amount measurement selection unit for selecting a signal level at a last maximum point detected by the maximum light amount detection unit when the focus control unit is not working; and a gain calculation unit for calculating a gain based on a signal from the amplitude measurement unit and a signal from the last light amount measurement selection unit and setting the gain as the internal gain of the focus error normalization unit.

According to such a structure, even when the FE signal of the information surface with the large reflectance deteriorates due to the influence of the spherical aberration, the gain is calculated using, for example, the signal obtained from the information surface for which the spherical aberration is adapted. Thus, the variance in the gain of the focus control can be suppressed.

A semiconductor device of the thirty-sixth invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration adjustment unit for adjusting a spherical aberration so as to be optimum for an information surface to be a target of the focus control when the focus control unit is working; an amplitude measurement unit for measuring an amplitude of the signal from the focus error detection unit after the adjustment by the spherical aberration adjustment unit; a light amount measurement unit for measuring a level of the signal from the light amount detection unit after the adjustment by the spherical aberration adjustment unit; and a gain calculation unit for calculating a gain based on amplitude information from the amplitude measurement unit and light amount information from the light amount measurement unit and setting as the internal gain of the focus error normalization unit.

According to such a structure, even when the FE signal deteriorates due to the influence of the spherical aberration, the gain is calculated using the signal obtained from the information surface after the spherical aberration is adjusted. Thus, the variance in the gain of the focus control can be suppressed.

A semiconductor device of the thirty-seventh invention includes: a focus error detection unit for detecting a signal which corresponds to a shift in a position of a focus of an optical beam with respect to an information surface or a surface of an information carrier; a light amount detection unit for detecting a signal which corresponds to an amount of reflected light of the optical beam from the information carrier; a focus error normalization unit for normalizing a signal from the focus error detection unit based on a signal from the light amount detection unit and an internal gain; a focus control unit for changing a convergence state of the optical beam such that the focus of the optical beam follows the information surface of the information carrier in accordance with a signal from the focus error normalization unit; a spherical aberration setting unit for setting a spherical aberration adapted for one information surface of the information carrier when the focus control unit is not working; an amplitude measurement unit for measuring an amplitude of the signal from the focus error detection unit; a focus pull-in unit for operating the focus control unit with respect to the one information surface on which the spherical aberration setting unit is operated; a light amount measurement unit for measuring a level of the signal from the light amount detection unit; a gain calculation unit for calculating a gain based on amplitude information from the amplitude measurement unit and light amount information from an after-pull-in light amount measurement unit and setting the gain as the internal gain of the focus error normalization unit; a spherical aberration adjustment unit for adjusting a spherical aberration so as to be optimum for an information surface to be a target of the focus control when the focus control unit is working; a gain compensation unit for compensating the internal gain of the focus error normalization unit depending upon a spherical aberration amount adjusted by the spherical aberration adjustment unit.

According to such a structure, even when the FE signal deteriorates due to the influence of the spherical aberration, the spherical aberration is adjusted, and further, the gain is compensated based on the adjusted spherical aberration. Thus, the variance in the gain of the focus control can be suppressed.

The semiconductor device of the thirty-eighth invention is any of the twentieth, thirtieth, and thirty-fourth through thirty-seventh inventions which further includes a layer-depending gain switching unit which has internal gain candidates set for each of the information surfaces of the information carrier and switches among the internal gain candidates in accordance with the information surface which is a target of focus control to output an internal gain candidate, in which an output of the gain calculation unit is set for all of the internal gain candidates of the layer-depending gain switching unit.

According to such a structure, the first focus jump landing after a startup can be stabilized.

REFERENCE NUMERALS

Figure 1:
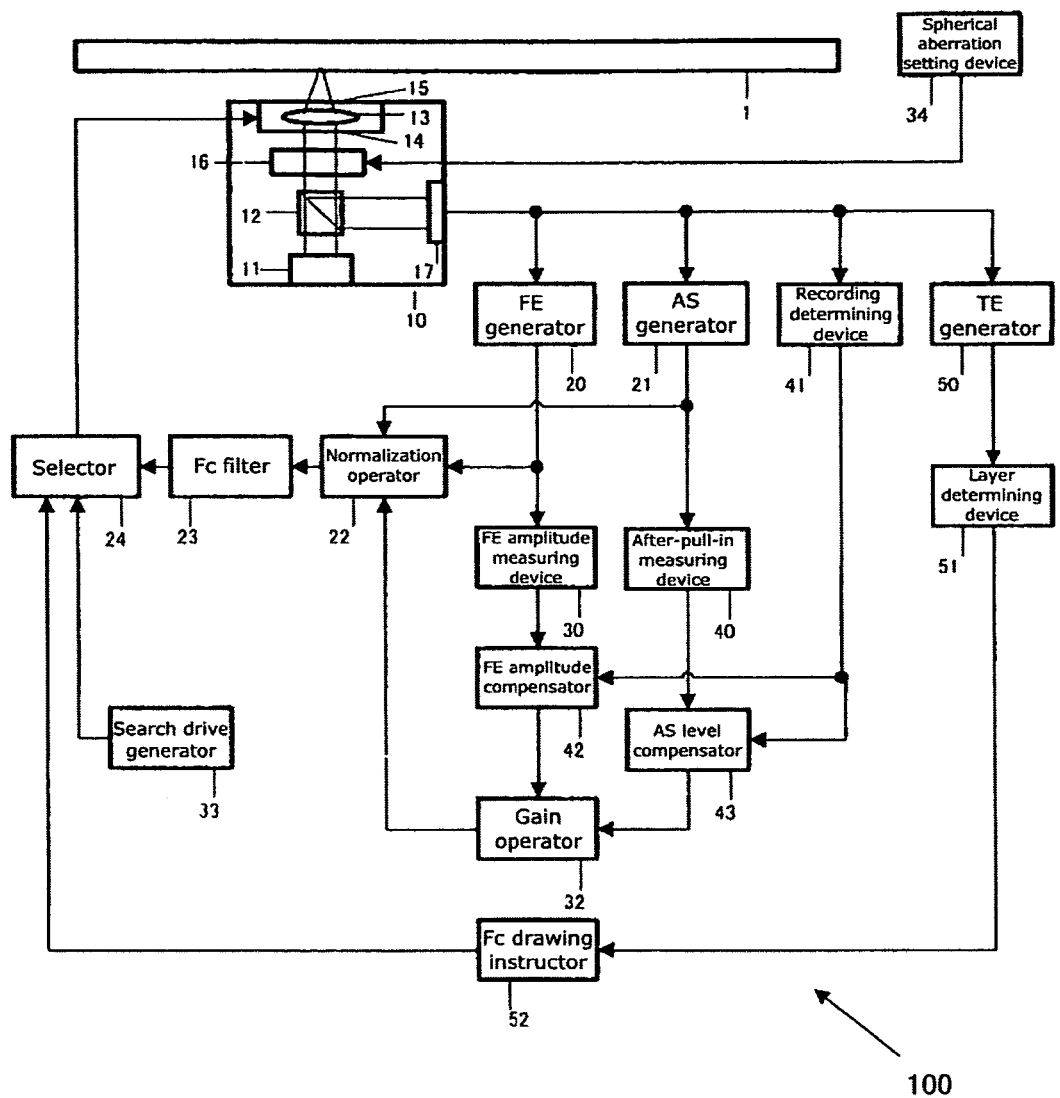
FIG. 1 is a block diagram showing a structure of the first embodiment.

1 Optical disc
10 Optical head
11 Semiconductor laser
12 Beam splitter
13 Condensing lens
14 Focus actuator
15 Tracking actuator
16 Spherical aberration generator
17 Photodetector
20 FE generator
21 AS generator
22 Normalization operator
23 Fc filter
24 Selector
30 FE amplitude measuring device
31 AS level measuring device
32 Gain operator
33 Search drive generator
34 Spherical aberration setting device
40 After-pull-in measuring device
41 Recording determining device
42 FE amplitude compensator
43 AS level compensator
50 TE generator
51 Layer determining device
52 Fc pull-in instructor
60 AS maximum measuring device
61 Measurement selecting device
62 AS maximum number measuring device
70 Last measurement selecting device
80 Spherical aberration adjustor
81 Selector
82 Gain compensator
100 Optical disc apparatus
200 Optical disc apparatus
300 Optical disc apparatus

BEST MODE FOR CARRYING OUT THE INVENTION

Hereinafter, embodiments of the present invention will be described.

Embodiment 1

<Structure and Operation>

Operations of an optical disc apparatus 100 according to the first embodiment will be described with reference to FIGS. 1 through 4.

FIG. 1 is a block diagram.

Figure 2A:
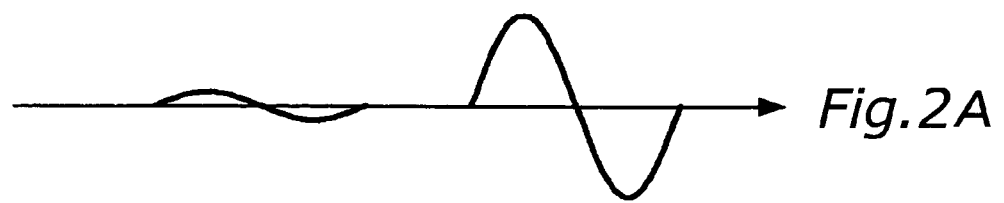
FIG. 2: (a) is a diagram showing an example of a signal output from an FE generator according to the first embodiment; (b) is a diagram showing an example of a signal output from an AS generator according to the first embodiment.
Figure 2B:
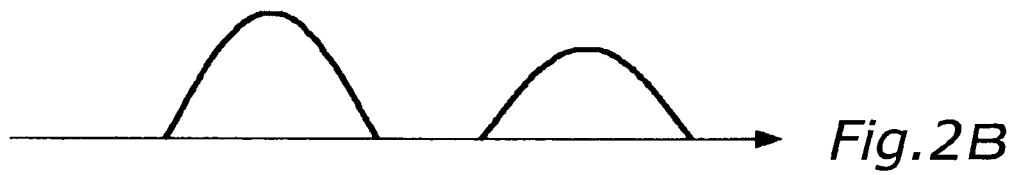

FIG. 2(a) shows an example of a signal output from a FE generator 20. FIG. 2(b) shows an example of a signal output from an AS generator 21. In FIG. 2, a horizontal axis indicates a position of a focus of a optical beam in a focus direction with respect to an optical disc 1.

Figure 3A:
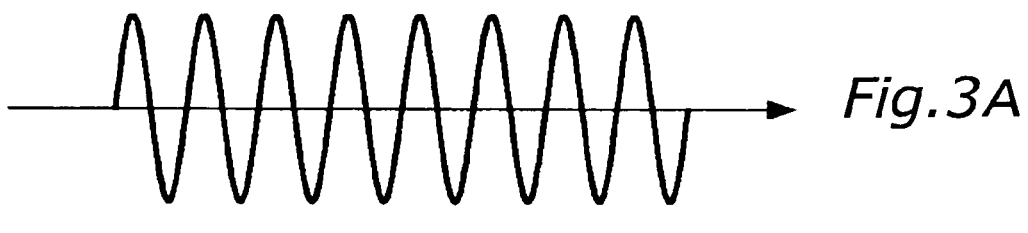
FIG. 3: (a) is a diagram showing an example of a signal output from a TE generator when a spherical aberration is adapted for an information surface for which focus control is working according to the first embodiment; and (b) is a diagram showing an example of a signal output from the TE generator when the spherical aberration is not adapted for an information surface for which focus control is working according to the first embodiment.
Figure 3B:

FIG. 3(a) shows an example of a signal output from a TE generator 50 when a spherical aberration is set for an information surface for which focus control is working. FIG. 3(b) shows an example of a signal output from the TE generator 50 when a spherical aberration is not set for an information surface for which focus control is working. In FIG. 3, a horizontal axis indicates time.

Figure 4A:
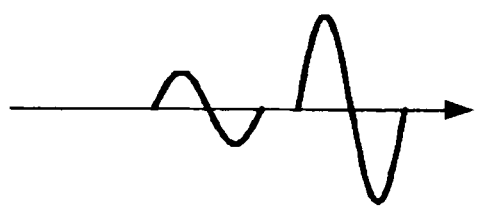
FIG. 4: (a) is a diagram showing an example of a signal output from the FE generator when an amplitude of the FE signal is being measured according to the first embodiment; (b) is a diagram showing an example of a signal output from the AS generator when the amplitude of the FE signal is being measured according to the first embodiment; and (c) is a diagram showing an example of a signal output from the AS generator when the AS is being measured according to the first embodiment.
Figure 4B:
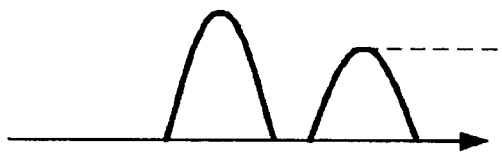
Figure 4C:
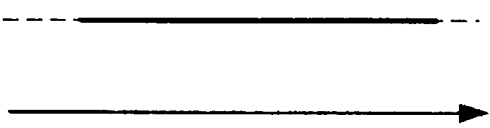

FIG. 4(a) shows an example of a signal output from the FE generator 20 when an amplitude of an FE signal is being measured. FIG. 4(b) shows an example of a signal output from the AS generator 21 when an amplitude of an FE signal is being measured. FIG. 4(c) shows an example of a signal output from the AS generator 21 when the AS being measured. In FIG. 4, a horizontal axis indicates time.

Figure 9:
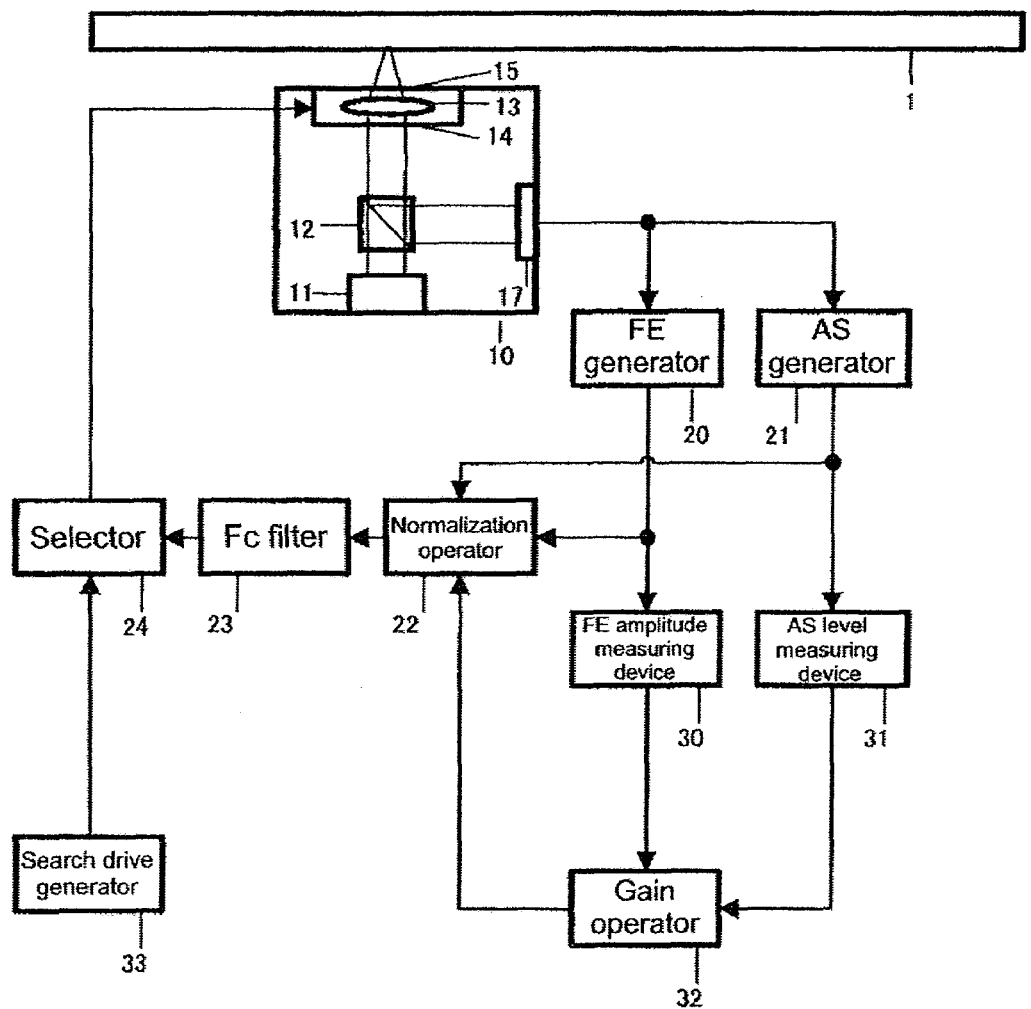
FIG. 9 is a block diagram showing a structure of the conventional art.
Figure 10A:
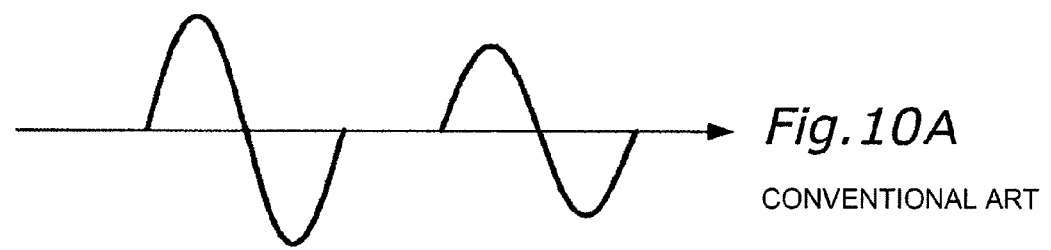
FIG. 10: (a) is a diagram showing an example of a signal output from an FE generator according to the conventional art; and (b) is a diagram showing an example of a signal output from an AS generator according to the conventional art.
Figure 10B:
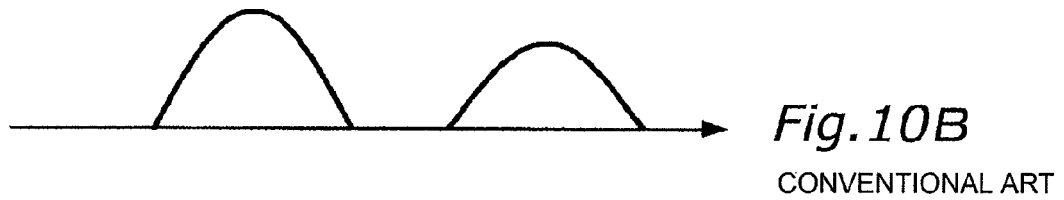

In FIG. 1, components same as those shown in FIG. 9 which shows a conventional art are denoted by the same reference numerals, and descriptions thereof are omitted. The after-pull-in light amount measurement unit is an after-pull-in AS measuring device 40. The recording state detection unit is a recording determining device 41. The unrecorded amplitude estimation unit (recording amplitude estimation unit) is an FE amplitude compensator 42. The unrecorded light amount estimation unit (recording light amount estimation unit) is an AS level compensator 43. The layer detection unit is a layer determining device 51. The track error detection unit is a TE generator 50. The spherical aberration setting unit is a spherical aberration setting device 34. The focus pull-in unit is, for example, an Fc pull-in instructor 52. The focus pull-in unit may also be realized as a control section which is not shown. The light amount measurement compensation unit include the FE amplitude compensator 42, the AS level compensator 43, and a gain operator 32.

The AS generator 21 sends a signal to a normalization operator 22 and the after-pull-in AS measuring device 40. An FE amplitude measuring device 30 sends a measured value to the FE amplitude compensator 42. The after-pull-in AS measuring device 40 measures a signal from the AS generator 21 when the focus control is working, and sends the signal to the AS level compensator 43.

The recording determining device 41 uses a light amount signal of a photodetector 17 to detect whether a part of the optical disc 1 that is irradiated by the optical beam is in a recorded state or unrecorded state. Specifically, this detection on whether it is in the recording state or the unrecorded state is achieved by determining whether the light amount signal exceeds a predetermined threshold or not. More specifically, it is detected (determined) that it is in the unrecorded state when the value of the obtained light amount signal is not lower than the predetermined threshold value, and that it is in the recorded state when the value is below the predetermined threshold value. The recording determining device 41 sends the detected state to the FE amplitude compensator 42 when the focus control is not working. When the focus control is working, the recording determining device 41 sends the detected state to the AS level compensator 43.

The FE amplitude compensator 42 sends the measured value from the FE amplitude measuring device 30 to the gain operator 32 as it is when the signal from the recording determining device 41 indicates the unrecorded state. On the other hand, when the signal from the recording determining device 41 indicates the recorded state, the FE amplitude compensator 42 multiply the measured value from the FE amplitude measuring device 30 by the preset recorded and unrecorded ratio gain, and sends the calculated result to the gain operator 32.

The AS level compensator 43 sends the measured value from the after-pull-in AS measuring device 40 to the gain operator 32 as it is when the signal from the recording determining device 41 indicates the unrecorded state. On the other hand, when the signal from the recording determining device 41 indicates the recorded state, the AS level compensator 43 multiplies the measured value from the after-pull-in AS measuring device 40 by the preset recorded and unrecorded ratio gain, and sends the calculated result to the gain operator 32.

The gain operator 32 multiplies the preset FE target amplitude by the measured value from the AS level compensator 43, and then divides by the other measured value from the FE amplitude compensator 42. The gain operator 32 sets the gain value obtained in this way as an internal gain of the normalization operator 22.

The TE generator 50 uses the light amount signal from the photodetector 17 to calculate a TE signal which indicates a positional relationship between the optical beam on the optical disc 1 and tracks. The TE generator 50 sends the TE signal to the layer determining device 51. The layer determining device 51 sends a pull-in instruction to the Fc pull-in instructor 52 only when the amplitude of the signal from the TE generator 50 does not exceeds a predetermined value. When the signal from the layer determining device 51 is a pull-in instruction, the Fc pull-in instructor 52 sends a switching signal to a selector 24 to inactivate the focus control and then activate again.

The spherical aberration setting device 34 sends a spherical aberration amount to a spherical aberration generator 16. The spherical aberration amount is adapted for a material thickness between the surface (the surface to be irradiated by the optical beam) and an information surface (for example, the information surface at the furthest from the surface to be irradiated). The spherical aberration generator 16 gives a spherical aberration to the optical beam in accordance with a signal from the spherical aberration setting device 34. The spherical aberration setting device 34 may have a memory for storing spherical aberration amounts set for the respective information surfaces so that it may output a spherical aberration amount for a desired information surface.

<Effects>
[1]
Regarding the optical disc apparatus 100 of the first embodiment, an example of a signal obtained from an information surface for which a spherical aberration is adapted is shown on a right-hand side of FIG. 4, and an example of a signal obtained from an information surface for which a spherical aberration is not adapted is shown on a left-hand side of FIG. 4. In the above description, the spherical aberration is adapted for the furthest information surface from the front surface irradiated by the optical beam. Thus, the reflectance of the information surface for which the spherical aberration is not adapted is assumed to be larger than the reflectance of the information surface for which the spherical aberration is adapted. In such an example, the AS signal obtained from the information surface for which the spherical aberration is not adapted (see right-hand side of FIG. 4(b) is large because the reflectance of the information surface is large. On the other hand, the FE signal obtained from the information surface for which the spherical aberration is not adapted is small because it significantly deteriorates due to the spherical aberration.

Therefore, even when the FE signal and the AS signal used for calculation has to be obtained from the same information surface for obtaining an internal gain of the normalization operator 22 according to the conventional art, there is no guarantee that the FE signal and the AS signal are obtained from the same information surface if only the largest value and the smallest value of the FE signal and the largest value of the AS signal are obtained. Specifically, the largest value and the smallest value of the FE signal from the FE generator 20, which are generated when a condensing lens 13 is moved vertically for search by a search driving generator 33, are ensured to be values of the information surface for which the spherical aberration is adapted. Meanwhile, the largest value of the AS signal from the AS generator 21 is the value obtained from the information surface with a large reflectance. Thus, it is not ensured to be a value of the information surface for which the spherical aberration is adapted. More specifically, as the largest value and the smallest value of the FE signal, the largest value and the smallest value on the right-hand side of FIG. 4(*a*) is employed, while, as the largest value of the AS signal, the largest value of the signal on the left-hand side of FIG. 4(*b*) which is obtained from a different information surface may be employed.

On the contrary, as in the present invention, if the AS signal from the AS generator 21 is measured by the after-pull-in AS measuring device 40 with the focus control being working on the information surface for which the spherical aberration is adapted, the measured value of the AS signal is ensured to be the measured value of the AS signal of the information surface for which the spherical aberration is adapted as shown in FIG. 4(*c*). In this way, the gain operator 32 can appropriately calculate the internal gain of the normalization operator 22 by measuring the FE signal from the FE generator 20 when the focus control is not working and measuring the AS signal from the AS generator 21 when the focus control is working.

In terms of achieving the above-described effect, the recording determining device 41, the FE amplitude compensator 42, the AS level compensator 43, the TE generator 50, the layer determining device 51, the Fc pull-in instructor 52 and the like are not essential parts of the structure.

In the first embodiment, it is described that "a spherical aberration amount adapted for a material thickness between the surface to be irradiated and an information surface toward the other side surface is sent to the spherical aberration generator 16". However, it may be described that a spherical aberration amount adapted for a material thickness between the surface to be irradiated and an information surface toward the surface to be irradiated is sent to the spherical aberration generator 16 instead.

[2]

Figures 11A, 11B, 11C:
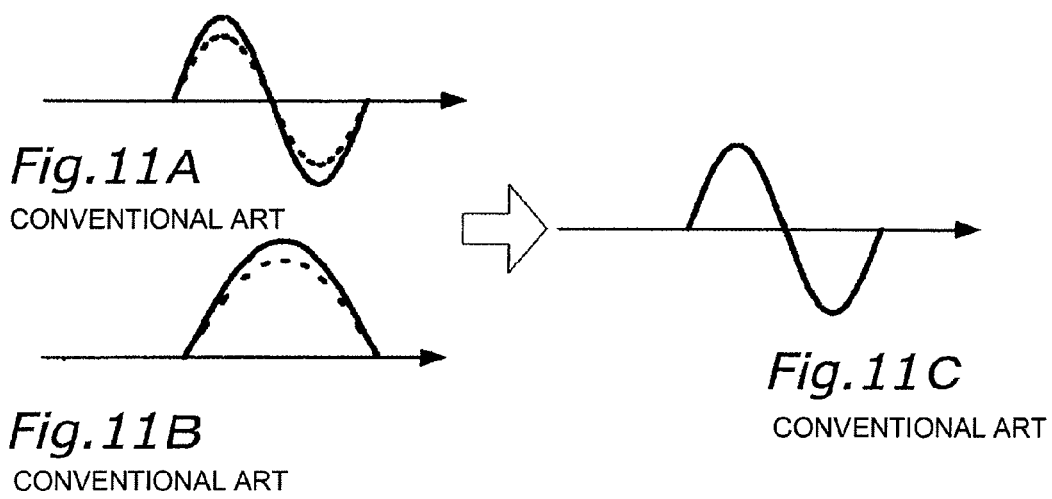
FIG. 11: (a) is a diagram showing an example of a signal output from the FE generator when an optical disc is either in a recorded state or in an unrecorded state according to the conventional art; (b) is a diagram showing an example of a signal output from an AS generator when the optical disc is either in the recorded state or in the unrecorded state according to the conventional art; and (c) is a diagram showing an example of a signal output from a normalization calculator according to the conventional art

In the conventional art, the timing to measure the FE signal from the FE generator 20 and the timing to measure the AS signal from the AS generator 21 are separated from each other in terms of time. Thus, it is not guaranteed that the measured signals are measured at the same point on the information surface of the optical disc 1. As shown in FIG. 11, the amplitude of the FE signal and the level of the AS signal which are measured are different between in the recorded state and in the unrecorded state even on the same information surface. In the conventional art, however, the internal gain is derived using the FE signal and the AS signal without taking this fact into account.

On the contrary, according to the present invention, when the signals are measured, the recording determining device 41 determines whether the point of measurement is in the recorded state or in the unrecorded state. If it is determined to be in the recorded state, the FE amplitude compensator 42 and the AS level compensator 43 uses a ratio of the reflectance which varies between in the recorded state and in the unrecorded state. Specifically, the FE amplitude compensator 42 and the AS level compensator 43 multiply the value by the ratio of the reflectance of the recorded state and the unrecorded state to convert the measured value of the signal into a value which would have been measured and obtained in the unrecorded state. In this way, the internal gain of the normalization operator 22 which does not depend on the recording state can be obtained irrespective of whether the point of measuring the signals is in the recording state or in the unrecorded state.

In the above first embodiment, the measured values of the signals are all converted into values which would have been measured and obtained in the unrecorded state. However, the measured values of the signals may all be converted into values which would have been measured in the recorded state instead.

[3]

In the optical disc apparatus 100 of the first embodiment, for measuring the AS signal from the AS generator 21 for the information surface for which the spherical aberration is adapted, focus control of the optical beam for the information surface for which the spherical aberration is adapted is necessary. Thus, for ensuring the focus control of the optical beam for the information surface for which the spherical aberration is adapted, the information surface is determined by using the TE signal in the first embodiment.

As shown in FIG. 3, the TE signal from the TE generator 50 has the signal amplitude which deteriorates due to spherical aberration, similarly to the FE signal from the FE generator 20. By taking an advantage of this property, in the first embodiment, the amplitude of the TE signal from the TE generator 50 is determined by the layer determining device 51 after the focus control is activated. Then, the amplitude is determined whether it does not exceed a predetermined value. In this way, whether the focus control is working on the information surface for which the spherical aberration is adapted can be determined.

As a result of the determination, if it is determined that focus control is working on the information surface for which the spherical aberration is not adapted, the focus control is inactivated for a time, and then activated again (re-pulling in the focus). In this way, the focus control is allowed to be working on the information surface for which the spherical aberration is adapted.

As described above, according to the present invention, when the focus control is not working, only the amplitude of the FE signal is measured and the level of the AS signal is measured after the focus control is activated. This allows the internal gain of the normalization operator 22 to be calculated accurately even when the FE signal of the information surface with a large reflectance deteriorates due to an influence of the spherical aberration, so that the stable focus control can be realized.

In the first embodiment, the information surface is determined based on the amplitude of the TE signal. However, the spherical aberration adjustment may be performed, and the information surface may be determined by the adjusted spherical aberration value.

<Others>

In the FE amplitude compensator 42 and the AS level compensator 43, only the values measured at the portion in the recorded state are compensated and converted into the values which would have been measured in the unrecorded state. However, only the values measured at the portion in the unrecorded state may be compensated and converted into the values which would have been measured in the recorded state instead.

Moreover, in the FE amplitude compensator 42 and the AS level compensator 43, it is described that both the FE signal and the AS signal are compensated. However, the state of the information surface when the amplitude of the FE signal is measured (in the recorded state or in the unrecorded state) may be stored, and the AS signal measured when the AS level is measured may be compensated so as to conform to the stored state of the information surface.

In the optical disc apparatus 100, the gain operator 32 may store the gain corresponding to an expected value of the reflectance of the optical disc 1, and set the gain as an initial internal gain value of the normalization operator 22 before the focus control is pulled in. Further, the gain operator 32 may calculate the gain based on the measured value from the FE amplitude measuring device 30 and set the calculated result as the initial internal gain value of the normalization operator 22 before the focus control is pulled in.

Embodiment 2

<Structure and Operation>

Operations of an optical disc apparatus 200 according to the second embodiment will be described with reference to FIGS. 5 and 6.

Figure 5:
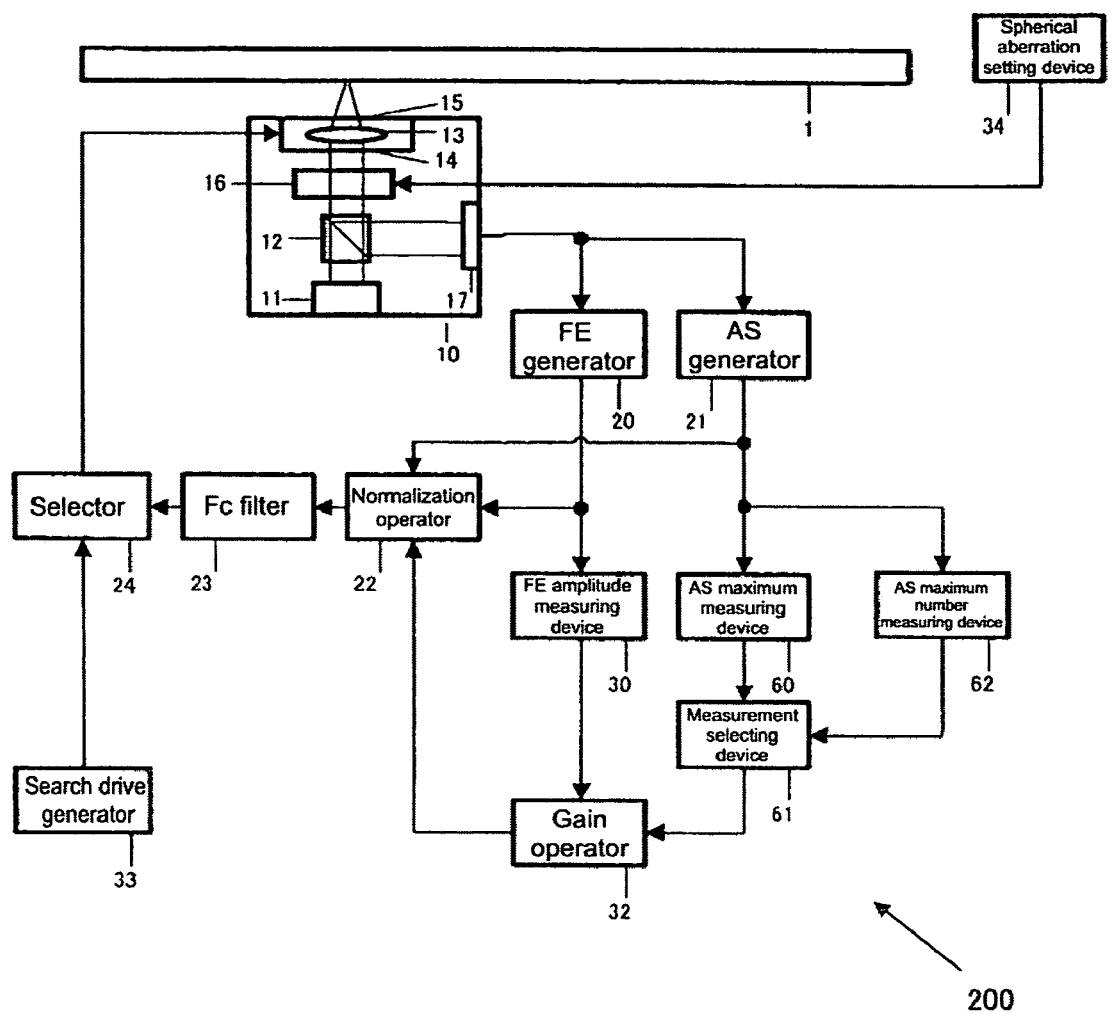
FIG. 5 is a block diagram showing a structure of the second embodiment.

FIG. 5 is a block diagram.

Figure 6A:
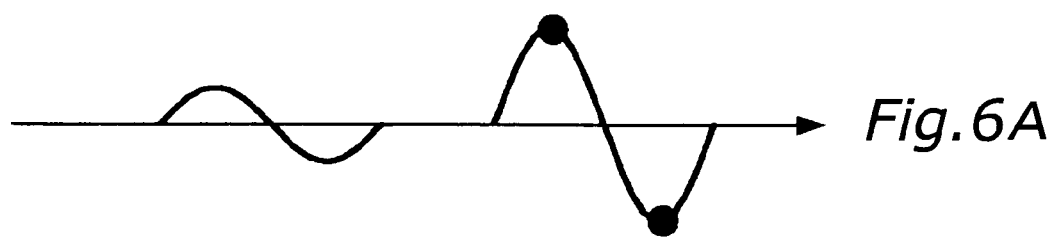
FIG. 6: (a) is a diagram showing an example of a signal output from an FE generator according to the second embodiment; and (b) is a diagram showing an example of a signal output from an AS generator, a measurement result of an AS maximum measuring device and a result of a selection by a measurement selecting device according to the second embodiment; and (c) is a diagram showing an example of a timing signal output from the AS maximum number measuring device according to the second embodiment.
Figure 6B:
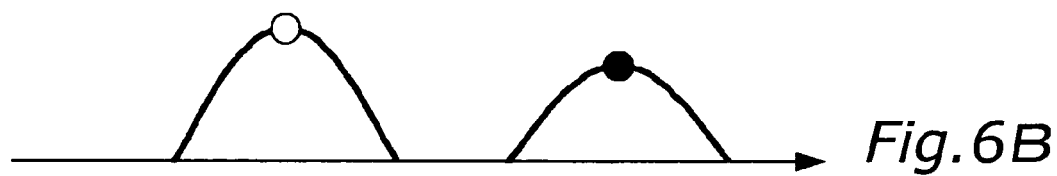
Figure 6C:
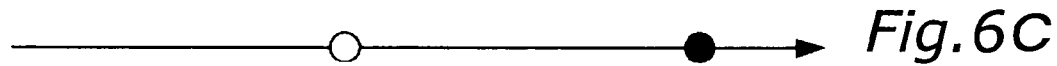

FIG. 6(a) shows an example of a signal output from an FE generator 20. FIG. 6(b) shows an example of a signal output from an AS generator 21, measurement result of an AS maximum measuring device 60, and a result of selection by a measurement selector 61. FIG. 6(c) shows an example of a timing signal output from an AS maximum number measuring device 62. In FIG. 6, a horizontal axis indicates a position of a focus of an optical beam in the focus direction with respect to an optical disc 1.

In FIG. 5, components same as those shown in FIG. 9 which shows a conventional art are denoted by the same reference numerals, and descriptions thereof are omitted. The maximum light amount detection unit is the AS maximum measuring device 60. The light amount measurement selection unit is the measurement selector 61. The light amount maximum number timing detection unit is the AS maximum number measuring device 62. The spherical aberration setting unit is a spherical aberration setting device 34.

The AS generator 21 sends a signal to a normalization operator 22, the AS maximum measuring device 60, and the AS maximum number measuring device 62. The AS maximum measuring device 60 measures all the maximum values of the signal from the AS generator 21, and sends them to the measurement selector 61. The AS maximum number measuring device 62 detects a timing when the number of the maximum values of the AS generator 21 reaches a predetermined number, and sends it to the measurement selector 61.

The measurement selector 61 selects a maximum value measured by the AS maximum measuring device 60 at a timing closest to the timing sent from the AS maximum number measuring device 62, and sends it to a gain operator 32.

The gain operator 32 multiplies a preset FE target amplitude by the measured value from the measurement selector 61 and then divides the result by a measured value from a FE amplitude measuring device 30. The gain operator 32 sets the gain value obtained in this way as an internal gain of the normalization operator 22.

The spherical aberration setting device 34 sends a spherical aberration amount, which is adapted for a material thickness between the surface (the surface irradiated by an optical beam) and a further information surface (for example, the information surface closest to the other side surface) to a spherical aberration generator 16. The spherical aberration generator 16 gives a spherical aberration to the optical beam in accordance with the signal from the spherical aberration setting device 34.

<Effects>

An example of a signal obtained from an information surface for which the spherical aberration is adapted is shown on the left hand side of FIG. 6. An example of a signal obtained from an information surface for which the spherical aberration is not adapted is shown on the right hand side of FIG. 6.

An amplitude of the FE signal measured by the FE amplitude measuring device 30 is denoted by a difference in levels of two filled circles in FIG. 6(a). The maximum values of the AS signal measured by the AS maximum measuring device 60 are denoted by a blank circle and a filled circle in FIG. 6(b).

The AS maximum number measuring device 62 counts the number of the information surfaces when the AS signal from the AS generator 21 exceeds the maximum value for a time and then declines by a predetermined level. A timing of the first counting is denoted by a blank circle in FIG. 6(c). A timing of the second counting is denoted by a filled circle in FIG. 6(c).

Herein, the information surface for which the spherical aberration is adapted is the second (further) information surface from the surface to be irradiated. Thus, the measurement selector 61 obtains the timing denoted by the filled circle in FIG. 6(c) (timing of the second counting) from the AS maximum number measuring device 62. Then, the measurement selector 61 selects the filled circle in FIG. 6(b), which indicates the maximum value measured at a timing closest to that of the filled circle shown in FIG. 6(c), from the maximum values measured by the AS maximum measuring device 60. This selection allows the FE signal amplitude and the AS signal level of the information surface for which the spherical aberration is adapted to be measured. The gain operator 32 can calculate the internal gain of the normalization operator 22.

In the second embodiment, the FE signal amplitude and the AS signal level are measured at the same time while the focus control is not working, and the maximum value of the measured AS signal level is selected based on the number of generated maximum values. In this way, even when the FE signal for the information surface with the large reflectance deteriorates due to an influence of the spherical aberration, the internal gain of the normalization operator 22 can be calculated accurately and the stable focus control can be realized.

In the second embodiment, the maximum value of the AS signal level is selected based on the number of the maximum values of the AS signal level. However, the maximum value of the AS signal level may be selected based on the number of amplitudes of the FE signal instead. In such an example, the optical disc apparatus 200 may include an FE amplitude number measuring device which obtains an FE signal and counts the number of amplitudes of the FE signal and which detects a timing at which it obtains the information surface number until it reaches the information surface for which the spherical aberration is adapted. Alternatively, the maximum value of the AS signal measured between the largest value and the smallest value of the FE signal may be selected. In such an example, the optical disc apparatus 200 may include a largest and smallest timing detector which obtains an FE signal and detects a timing at which the FE signal becomes the largest and a timing at which it becomes the smallest.

Regarding the second embodiment, examples where there are two information surfaces have been mainly described.

However, the present embodiment can also be applied to examples where the optical disc 1 has more information surfaces.

Embodiment 3

<Structure and Operation>
Operations of an optical disc apparatus 300 according to Embodiment 3 will be described with reference to FIGS. 7 and 8.

Figure 7:
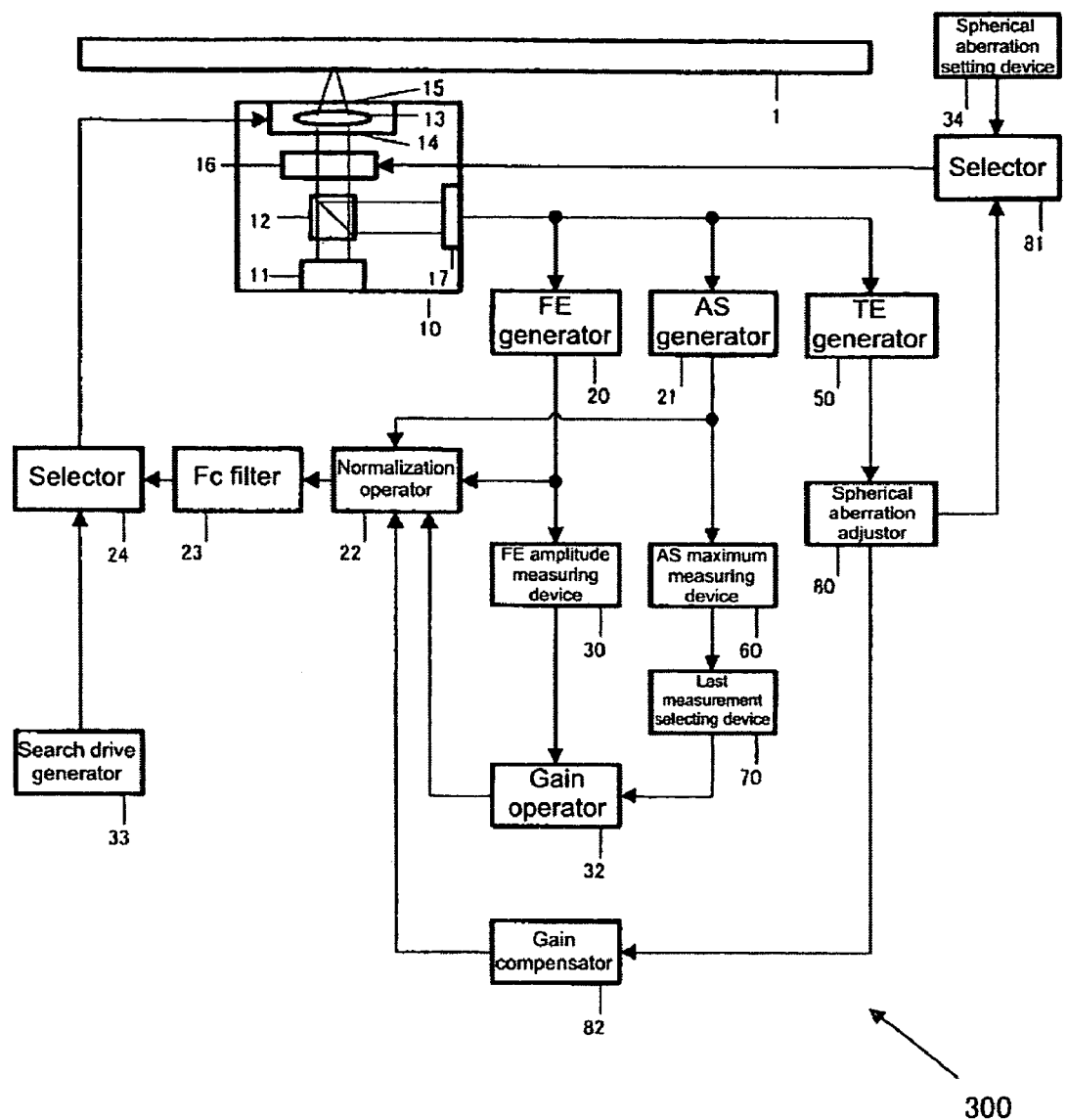
FIG. 7 is a block diagram showing a structure of the third embodiment.

FIG. 7 is a block diagram.

Figure 8A:
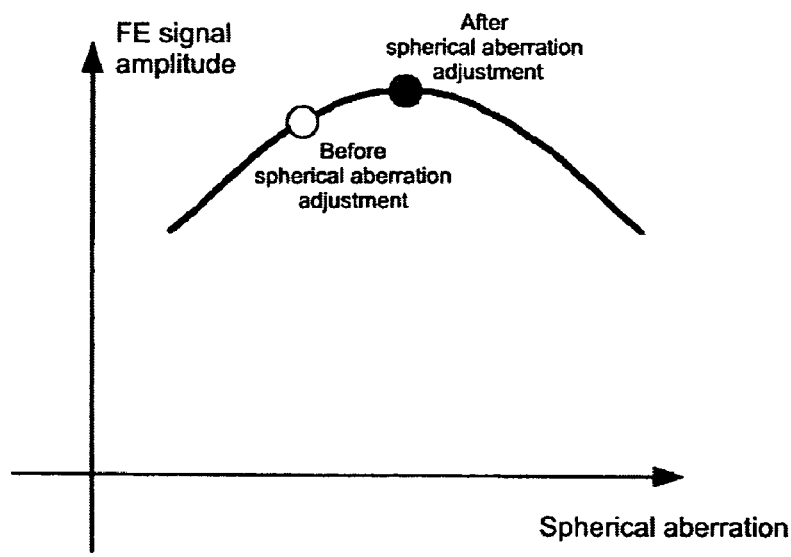
FIG. 8: (a) is a diagram showing an example of an amplitude property of the FE signal with respect to the spherical aberration according to the third embodiment.
FIG. 8(b) is a diagram showing an example of an internal gain property of a normalization operator with respect to the spherical aberration according to the third embodiment.
Figure 8B:
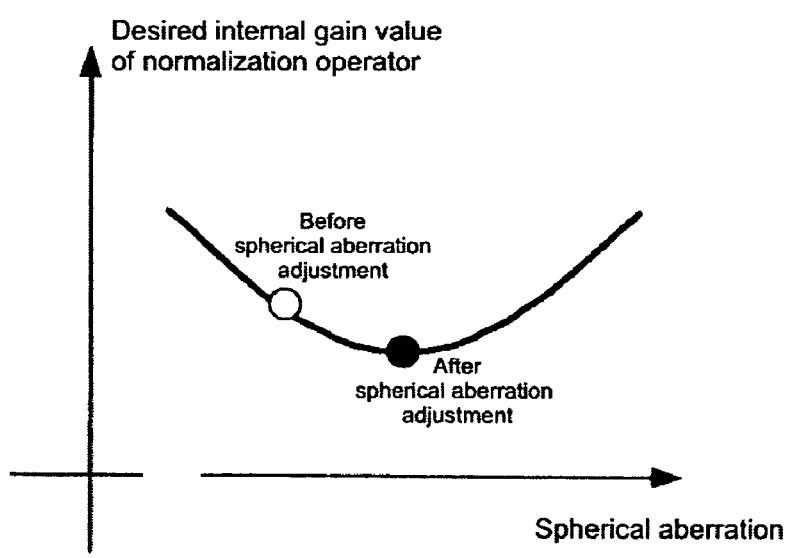

FIG. 8(a) shows an example of an amplitude property of an FE signal with respect to a spherical aberration. FIG. 8(b) shows an example of an internal gain property of a normalization operator 22 with respect to the spherical aberration.

In FIG. 7, components same as those shown in FIG. 9 which shows a conventional art are denoted by the same reference numerals, and descriptions thereof are omitted. The spherical aberration adjustment unit is a spherical aberration adjustor 80. The last light amount measurement selection unit (the first light amount measurement selection unit) is a last measurement selector 70. The gain compensation unit is a gain compensator 82. The spherical aberration setting unit is a spherical aberration setting device 34.

An AS generator 21 sends a signal to a normalization operator 22 and an AS maximum measuring device 60. The AS maximum measuring device 60 measures all the maximum values of the signal from the AS generator 21, and sends them to the last measurement selector 70.

The last measurement selector 70 selects the maximum value measured at last from the maximum values from the AS maximum measuring device 60, and sends it to a gain operator 32.

The gain operator 32 multiplies the preset FE target amplitude by the measured value from the last measurement selector 70, and then divides the result by the measured value from an FE amplitude measuring device 30. The gain operator 32 sets the gain value obtained in this way as the internal gain of the normalization operator 22.

The spherical aberration setting device 34 sends a spherical aberration amount which is adapted for a material thickness between the surface (the surface to be irradiated by the optical beam) to a further information surface (for example, the furthest information surface from the surface to be irradiated) to a spherical aberration generator 16. The spherical aberration generator 16 gives a spherical aberration to the optical beam in accordance with the signal from the spherical aberration setting device 34.

A TE generator 50 uses a light amount signal from a photodetector 17 to calculate a TE signal which indicates a positional relationship between the optical beam and a track on the optical disc 1, and sends it to the spherical aberration adjustor 80. The spherical aberration adjustor 80 sends the spherical aberration amount to the spherical aberration generator 16 via a selector 81, and adjusts the spherical aberration such that the amplitude of the TE signal from the TE generator 50 becomes the largest. Further, the spherical aberration adjustor 80 sends an amount of change in the spherical aberration before the adjustment and after the adjustment to the gain compensator 82. The gain compensator 82 compensates the internal gain of the normalization operator 22 in accordance with the amount of change in the spherical aberration from the spherical aberration adjustor 80.

<Effects>
[1]
The spherical aberration setting device 34 adapts the spherical aberration to the information surface further from the surface to be irradiated. A search drive generator 33 moves a condensing lens 13 by a search drive signal and moves the focus of the optical beam from the surface of the optical disc 1 to be irradiated toward the other side surface. Then, the last measurement selector 70 selects the maximum value which is selected last from the maximum values of the AS signal measured by the AS maximum measuring device 60 during the movement. In this way, the FE signal amplitude and the AS signal level for the information surface for which the spherical aberration is adapted can be measured. The gain operator 32 can calculate the internal gain of the normalization operator 22.

[2]
In the optical disc 1 having a plurality of information surfaces, the material thickness up to the information surfaces varies. Thus, it is required to adjust the spherical aberration after the focus control is activated so as to conform to the material thickness up to the target information surface.

On the other hand, in the optical disc apparatus 300 of the third embodiment, the internal gain of the normalization operator 22 is obtained with the focus control being inactivated. Thus, if the spherical aberration is adjusted after that, the focus control gain is shifted from a desired value. Therefore, in the optical disc apparatus 300 of the third embodiment, the focus control gain is compensated by utilizing the property which will be described below.

As shown in FIG. 8(a), the amplitude of the FE signal from the FE generator 20 is increased when the spherical aberration adjustor 80 adjusts the spherical aberration. In such an adjustment of the spherical aberration, the spherical aberration adjustor 80 adjusts the spherical aberration such that the amplitude of the TE signal from the TE generator 50 becomes the largest. The amplitude of the FE signal of the FE signal from the FE generator 20 has such a characteristic that it becomes the largest when the amplitude of the TE signal from the TE generator 50 is the largest. Since the amplitude of the FE signal increases by the adjustment of the spherical aberration as described above, the value required as the internal gain of the normalization operator 22 for obtaining a desired value of the focus control gain becomes small as shown in FIG. 8(b).

Thus, in the optical disc apparatus 300 of the third embodiment, the gain compensator 82 previously stores the internal gain variance property (for example, the property as shown in FIG. 8(b)) and compensates the internal gain using the amount of change of the spherical aberration obtained from the spherical aberration adjustor 80 before and after the adjustment of the spherical aberration. Specifically, a compensation ratio (a ratio of the internal gain before and after the adjustment of the spherical aberration) is calculated based on the amount of a change in the spherical aberration obtained from the spherical aberration adjustor 80. Then, the value of the internal gain from by the gain operator 32 is compensated based on the calculated compensation ratio, and the compensated value is employed as the internal gain of the normalization operator 22. In this way, the focus control gain shift due to the spherical aberration adjustment can be compensated.

[3]
In the optical disc apparatus 300 of the third embodiment, the spherical aberration of the optical beam is adapted to the information surface further from the surface of the optical disc 1 to be irradiated, and the amplitude of the FE signal and the level of the AS signal are simultaneously measured when the focus control is not working. Then, the maximum value of the level of the AS signal measured last is selected. In this way, even when the FE signal of the information surface with a large reflectance deteriorates due to the influence of the spherical aberration, the internal gain of the normalization operator 22 can be calculated accurately and the stable focus control can be realized.

<Others>

In the third embodiment, it is described that the spherical aberration of the optical beam is adapted to the information surface further from the surface of the optical disc 1 to be irradiated, and the last AS maximum value is selected. However, the spherical aberration of the optical beam may be adapted to the information surface closer to the surface of the optical disc 1 to be irradiated, and the first AS maximum value may be selected.

Furthermore, the internal gain of the normalization operator 22 is estimated after the spherical aberration is adjusted. However, the internal gain of the normalization operator 22 may be re-adjusted by measuring the amplitude of the FE signal and the level of the AS signal again.

(Others)

<1>

The present invention has been described with reference to the embodiments shown in the drawings. However, these embodiments are merely examples, and they are not described in order to limit the present invention. Various modifications and equivalent embodiments which may be conducted by those skilled in the art based on the basic concept of the present invention recited in the claims are within the scope of the present invention.

<2>

In the optical disc apparatuses 100, 200, and 300 as described in the above embodiments with reference to the drawings, the blocks may be respectively formed into one chip by a semiconductor device such as LSIs. Alternatively, some or all of the blocks may be formed into one chip.

Specifically, in FIGS. 1, 5, and 7, the blocks other than the optical disc 1 and an optical head 10 may be respectively formed into one chip, or some or all of the blocks may be formed into one chip.

Herein, the term LSI is used. However, the terms IC, system LSI, super LSI, or ultra LSI may also be used, depending upon the integration density.

Moreover, a circuit does not have to be integrated by an LSI method. Specific-purpose circuits or general purpose processors may be used for implementation. Alternatively, a field programmable gate array (FPGA) which can be programmed, or a reconfigurable processor which allows reconfiguration of connection and setting of circuit cells within the LSI after LSI is fabricated may be used.

In advent of a new technique for integrating circuits which may replace LSI when a semiconductor technology or another technology derived therefrom advances, functional blocks may be integrated using such a technique. Application of biotechnology may be one possibility.

<3>

In the optical disc apparatuses 100, 200, and 300 as described in the above embodiments, the gain operator 32 may store internal gain candidates set for every information surface of the optical disc 1 and switch them to output an internal gain candidate in accordance with the information surface which is the target of the focus control. In such an example, the equivalent gains which are calculated by the gain operator 32 are set as all the internal gain candidates. In this way, when the apparatus is powered on, the focus control is activated for one of the information surfaces, and then the focus control can be appropriately started for another information surface.

INDUSTRIAL APPLICABILITY

The present invention is applicable to an optical disc apparatus which performs stable focus control when information is recorded or reproduced on or from an information carrier having a disc shape which can be recorded (hereinafter, referred to as an optical disc).

The invention claimed is:

1. An optical disc apparatus comprising:
   a focus error detection unit for detecting a signal which corresponds to a shift in a position of a focus of an optical beam with respect to an information surface or a surface of an information carrier;
   a light amount detection unit for detecting a signal which corresponds to an amount of reflected light of the optical beam from the information carrier;
   a focus error normalization unit for normalizing a signal from the focus error detection unit based on a signal from the light amount detection unit and an internal gain;
   a focus control unit for changing a convergence state of the optical beam such that the focus of the optical beam follows the information surface of the information carrier in accordance with a signal from the focus error normalization unit;
   a spherical aberration setting unit for setting a spherical aberration adapted for one information surface of the information carrier when the focus control unit is not working;
   an amplitude measurement unit for measuring an amplitude of the signal from the focus error detection unit when the focus control unit is not working;
   a focus pull-in unit for operating the focus control unit with respect to the one information surface on which the spherical aberration setting unit is operated;
   an after-pull-in light amount measurement unit for measuring a level of the signal from the light amount detection unit when the focus of the optical beam is positioned on the one information surface by the focus pull-in unit; and
   a gain calculation unit for calculating a gain based on amplitude information from the amplitude measurement unit and light amount information from the after-pull-in light amount measurement unit and setting the gain as the internal gain of the focus error normalization unit.

2. The optical disc apparatus according to claim 1, further comprising:
   a recording state detection unit for detecting whether a position irradiated by the optical beam on the information surface of the information carrier is in a recorded state or in an unrecorded state; and
   a light amount measurement compensation unit for compensating a signal measured by the after-pull-in light amount measurement unit based on information obtained from the recording state detection unit when the amplitude measurement unit measures and information obtained from the recording state detection unit when the after-pull-in light amount measurement unit measures.

3. The optical disc apparatus according to claim 1, further comprising:
   a recording state detection unit for detecting whether a position irradiated by the optical beam on the information surface of the information carrier is in a recorded state or in an unrecorded state;
   an unrecorded amplitude estimation unit for estimating the amplitude of the signal from the focus error detection unit when the information carrier is in the unrecorded state based on information obtained from the recording state detection unit when the amplitude measurement unit measures and the signal measured by the amplitude measurement unit; and an unrecorded light amount estimation unit for estimating a signal level from the light amount detection unit when the information carrier is in the unrecorded state based on information obtained from the recording state detection unit when the after-pull-in light amount measurement unit measures and the signal measured by the after-pull-in light amount measurement unit.

4. The optical disc apparatus according to claim 1, further comprising:

a recording state detection unit for detecting whether a position irradiated by the optical beam on the information surface of the information carrier is in a recorded state or in an unrecorded state;

a recorded amplitude estimation unit for estimating the amplitude of the signal from the focus error detection unit when the information carrier is in the recorded state based on information obtained from the recording state detection unit when the amplitude measurement unit measures and the signal measured by the amplitude measurement unit; and a recorded light amount estimation unit for estimating a signal level from the light amount detection unit when the information carrier is in the recorded state based on information obtained from the recording state detection unit when the after-pull-in light amount measurement unit measures and the signal measured by the after-pull-in light amount measurement unit.

5. The optical disc apparatus according to claim 1, further comprising a layer detection unit for detecting whether the focus of the optical beam is positioned on the one information surface on which the spherical aberration setting unit is operated or not, wherein the focus pull-in unit performs a pull-in operation when the layer detection unit detects that the optical beam is not positioned on the one information surface on which the spherical aberration setting unit is operated.

6. The optical disc apparatus according to claim 5, further comprising a track error detection unit for detecting a signal which corresponds to a shift in a position between the optical beam and a track on the information carrier, wherein the layer detection unit performs the detection based on an amplitude of the signal from the track error detection unit.

7. The optical disc apparatus according to claim 5, further comprising a spherical aberration adjustment unit for adjusting a spherical aberration of the optical beam into an optimum state for the information surface when the focus control unit is working, wherein the layer detection unit performs the detection based on an optimal spherical aberration amount obtained by the spherical aberration adjustment unit.

8. The optical disc apparatus according to claim 1, wherein the spherical aberration setting unit includes a memory for storing a spherical aberration amount set for each of the information surfaces of the information carrier.

9. The optical disc apparatus according to claim 1, further comprising a fixed gain setting unit for setting a gain corresponding to an expected reflectance value of the information carrier as an initial internal gain value of the focus error normalization unit before the focus control is pulled in.

10. The optical disc apparatus according to claim 1, further comprising a before-pull-in gain setting unit for calculating a gain based on a measured value from the amplitude measurement unit and setting the gain as an initial internal gain value of the focus error normalization unit before the focus control is pulled in.

11. An optical disc apparatus comprising:

a focus error detection unit for detecting a signal which corresponds to a shift in a position of a focus of an optical beam with respect to an information surface or a surface of an information carrier;

a light amount detection unit for detecting a signal which corresponds to an amount of reflected light of the optical beam from the information carrier;

a focus error normalization unit for normalizing a signal from the focus error detection unit based on a signal from the light amount detection unit and an internal gain;

a focus control unit for changing a convergence state of the optical beam such that the focus of the optical beam follows the information surface of the information carrier in accordance with a signal from the focus error normalization unit;

a spherical aberration setting unit for setting a spherical aberration adapted for one information surface of the information carrier when the focus control unit is not working;

an amplitude measurement unit for measuring an amplitude of the signal from the focus error detection unit when the focus control unit is not working;

a maximum light amount detection unit for detecting a signal level at a maximum point of a signal from the light amount detection unit when the focus control unit is not working;

a light amount measurement selection unit for selecting the maximum point detected by the maximum light amount detection unit when the optical beam passes near the one information surface on which the spherical aberration setting unit is operated; and a gain calculation unit for calculating a gain based on amplitude information from the amplitude measurement unit and light amount information from the light amount measurement selection unit and setting the gain as the internal gain of the focus error normalization unit.

12. The optical disc apparatus according to claim 11, further comprising a largest and smallest timing detection unit for detecting a timing at which the signal from the focus error detection unit becomes the largest and a timing at which the signal from the focus error detection unit becomes the smallest, wherein the light amount measurement selection unit selects a signal level measured by the maximum light amount detection unit between the two timings obtained from the largest and smallest timing detection unit.

13. The optical disc apparatus according to claim 11, further comprising an amplitude timing detection unit for detecting a timing at which the number of amplitudes of the signal from the focus error detection unit reaches the number of the information surfaces up to the one information surface on which the spherical aberration setting unit is operated, wherein the light amount measurement selection unit selects a signal level measured by the maximum light amount detection unit at a timing closest to the timing detected by the amplitude number timing detection unit.

14. The optical disc apparatus according to claim 11, further comprising a light amount maximum number timing detection unit for detecting a timing at which the number of maximums of the signal from the light amount detection unit reaches the number of the information surfaces up to the one information surface on which the spherical aberration setting unit is operated, wherein the light amount measurement selection unit selects a signal level measured by the maximum light amount detection unit at a timing closest to the timing at which the light amount maximum number timing detection unit detects.

15. An optical disc apparatus comprising:
a focus error detection unit for detecting a signal which corresponds to a shift in a position of a focus of an optical beam with respect to an information surface or a surface of an information carrier;
a light amount detection unit for detecting a signal which corresponds to an amount of reflected light of the optical beam from the information carrier;
a focus error normalization unit for normalizing a signal from the focus error detection unit based on a signal from the light amount detection unit and an internal gain;
a focus control unit for changing a convergence state of the optical beam such that the focus of the optical beam follows the information surface of the information carrier in accordance with a signal from the focus error normalization unit;
a spherical aberration setting unit for setting a spherical aberration adapted for an information surface closest to the surface of the information carrier when the focus control unit is not working;
an amplitude measurement unit for measuring an amplitude of the signal from the focus error detection unit when the focus control unit is not working;
a maximum light amount detection unit for detecting a signal level at a maximum point of a signal from the light amount detection unit when the focus control unit is not working;
a first light amount measurement selection unit for selecting a signal level at a first maximum point detected by the maximum light amount detection unit when the focus control unit is not working; and
a gain calculation unit for calculating a gain based on a signal from the amplitude measurement unit and a signal from the first light amount measurement selection unit and setting the gain as the internal gain of the focus error normalization unit.

16. An optical disc apparatus comprising:
a focus error detection unit for detecting a signal which corresponds to a shift in a position of a focus of an optical beam with respect to an information surface or a surface of an information carrier;
a light amount detection unit for detecting a signal which corresponds to an amount of reflected light of the optical beam from the information carrier;
a focus error normalization unit for normalizing a signal from the focus error detection unit based on a signal from the light amount detection unit and an internal gain;
a focus control unit for changing a convergence state of the optical beam such that the focus of the optical beam follows the information surface of the information carrier in accordance with a signal from the focus error normalization unit;
a spherical aberration setting unit for setting a spherical aberration adapted for an information surface furthest from the surface of the information carrier when the focus control unit is not working;
an amplitude measurement unit for measuring an amplitude of the signal from the focus error detection unit when the focus control unit is not working;
a maximum light amount detection unit for detecting a signal level at a maximum point of the signal from the light amount detection unit when the focus control unit is not working;
a last light amount measurement selection unit for selecting a signal level at a last maximum point detected by the maximum light amount detection unit when the focus control unit is not working; and
a gain calculation unit for calculating a gain based on a signal from the amplitude measurement unit and a signal from the last light amount measurement selection unit and setting the gain as the internal gain of the focus error normalization unit.

17. An optical disc apparatus comprising:
a focus error detection unit for detecting a signal which corresponds to a shift in a position of a focus of an optical beam with respect to an information surface or a surface of an information carrier;
a light amount detection unit for detecting a signal which corresponds to an amount of reflected light of the optical beam from the information carrier;
a focus error normalization unit for normalizing a signal from the focus error detection unit based on a signal from the light amount detection unit and an internal gain;
a focus control unit for changing a convergence state of the optical beam such that the focus of the optical beam follows the information surface of the information carrier in accordance with a signal from the focus error normalization unit;
a spherical aberration adjustment unit for adjusting a spherical aberration so as to be optimum for an information surface to be a target of the focus control when the focus control unit is working;
an amplitude measurement unit for measuring an amplitude of the signal from the focus error detection unit after the adjustment by the spherical aberration adjustment unit;
a light amount measurement unit for measuring a level of the signal from the light amount detection unit after the adjustment by the spherical aberration adjustment unit; and
a gain calculation unit for calculating a gain based on amplitude information from the amplitude measurement unit and light amount information from the light amount measurement unit and setting the gain as the internal gain of the focus error normalization unit.

18. An optical disc apparatus comprising:
a focus error detection unit for detecting a signal which corresponds to a shift in a position of a focus of an optical beam with respect to an information surface or a surface of an information carrier;
a light amount detection unit for detecting a signal which corresponds to an amount of reflected light of the optical beam from the information carrier;
a focus error normalization unit for normalizing a signal from the focus error detection unit based on a signal from the light amount detection unit and an internal gain;
a focus control unit for changing a convergence state of the optical beam such that the focus of the optical beam follows the information surface of the information carrier in accordance with a signal from the focus error normalization unit;

a spherical aberration setting unit for setting a spherical aberration adapted for one information surface of the information carrier when the focus control unit is not working;

an amplitude measurement unit for measuring an amplitude of the signal from the focus error detection unit;

a focus pull-in unit for operating the focus control unit with respect to the one information surface on which the spherical aberration setting unit is operated;

a light amount measurement unit for measuring a level of the signal from the light amount detection unit;

a gain calculation unit for calculating a gain based on amplitude information from the amplitude measurement unit and light amount information from an after-pull-in light amount measurement unit and setting the gain as the internal gain of the focus error normalization unit;

a spherical aberration adjustment unit for adjusting a spherical aberration so as to be optimum for an information surface to be a target of the focus control when the focus control unit is working;

a gain compensation unit for compensating the internal gain of the focus error normalization unit depending upon a spherical aberration amount adjusted by the spherical aberration adjustment unit.

19. The optical disc apparatus according to claim 1, further comprising a layer-depending gain switching unit which has internal gain candidates set for each of the information surfaces of the information carrier and switches among the internal gain candidates in accordance with the information surface which is a target of the focus control to output an internal gain candidate, wherein an output of the gain calculation unit is set for all of the internal gain candidates of the layer-depending gain switching unit.

20. A semiconductor device comprising:

a focus error detection unit for detecting a signal which corresponds to a shift in a position of a focus of an optical beam with respect to an information surface or a surface of an information carrier;

a light amount detection unit for detecting a signal which corresponds to an amount of reflected light of the optical beam from the information carrier;

a focus error normalization unit for normalizing a signal from the focus error detection unit based on a signal from the light amount detection unit and an internal gain;

a focus control unit for changing a convergence state of the optical beam such that the focus of the optical beam follows the information surface of the information carrier in accordance with a signal from the focus error normalization unit;

a spherical aberration setting unit for setting a spherical aberration adapted for one information surface of the information carrier when the focus control unit is not working;

an amplitude measurement unit for measuring an amplitude of the signal from the focus error detection unit when the focus control unit is not working;

a focus pull-in unit for operating the focus control unit with respect to the one information surface on which the spherical aberration setting unit is operated;

an after-pull-in light amount measurement unit for measuring a level of the signal from the light amount detection unit when the focus of the optical beam is positioned on the one information surface by the focus pull-in unit; and a gain calculation unit for calculating a gain based on amplitude information from the amplitude measurement unit and light amount information from the after-pull-in light amount measurement unit and setting the gain as the internal gain of the focus error normalization unit.

21. The semiconductor device according to claim 20, further comprising:

a recording state detection unit for detecting whether a position irradiated by the optical beam on the information surface of the information carrier is in a recorded state or in an unrecorded state; and a light amount compensation measurement unit for compensating a signal measured by the after-pull-in light amount measurement unit based on information obtained from the recording state detection unit when the amplitude measurement unit measures and information obtained from the recording state detection unit when the after-pull-in light amount measurement unit measures.

22. The semiconductor device according to claim 20, further comprising:

a recording state detection unit for detecting whether a position irradiated by the optical beam on the information surface of the information carrier is in a recorded state or in an unrecorded state;

an unrecorded amplitude estimation unit for estimating the amplitude of the signal from the focus error detection unit when the information carrier is in the unrecorded state based on information obtained from the recording state detection unit when the amplitude measurement unit measures and the signal measured by the amplitude measurement unit; and an unrecorded light amount estimation unit for estimating a signal level from the light amount detection unit when the information carrier is in the unrecorded state based on information obtained from the recording state detection unit when the after-pull-in light amount measurement unit measures and the signal measured by the after-pull-in light amount measurement unit.

23. The semiconductor device according to claim 20, further comprising:

a recording state detection unit for detecting whether a position irradiated by the optical beam on the information surface of the information carrier is in a recorded state or in an unrecorded state;

a recorded amplitude estimation unit for estimating the amplitude of the signal from the focus error detection unit when the information carrier is in the recorded state based on information obtained from the recording state detection unit when the amplitude measurement unit measures and the signal measured by the amplitude measurement unit; and a recorded light amount estimation unit for estimating a signal level from the light amount detection unit when the information carrier is in the recorded state based on information obtained from the recording state detection unit when the after-pull-in light amount measurement unit measures and the signal measured by the after-pull-in light amount measurement unit.

24. The semiconductor device according to claim 20, further comprising a layer detection unit for detecting whether the focus of the optical beam is positioned on the one information surface on which the spherical aberration setting unit is operated or not, wherein the focus pull-in unit performs a pull-in operation when the layer detection unit detects that the optical beam is not positioned on the one information surface on which the spherical aberration setting unit is operated.

25. The semiconductor device according to claim 24, further comprising a track error detection unit for detecting a signal which corresponds to a shift in a position between the optical beam and a track on the information carrier,
wherein the layer detection unit performs the detection based on an amplitude of the signal from the track error detection unit.

26. The semiconductor device according to claim 24, further comprising a spherical aberration adjustment unit for adjusting a spherical aberration of the optical beam into an optimum state for the information surface when the focus control unit is working,
wherein the layer detection unit performs the detection based on an optimal spherical aberration amount obtained by the spherical aberration adjustment unit.

27. The semiconductor device according to claim 20, wherein the spherical aberration setting unit includes a memory for storing a spherical aberration amount set for each of the information surfaces of the information carrier.

28. The semiconductor device according to claim 20, further comprising a fixed gain setting unit for setting a gain corresponding to an expected reflectance value of the information carrier as an initial internal gain value of the focus error normalization unit before the focus control is pulled in.

29. The semiconductor device according to claim 20, further comprising a before-pull-in gain setting unit for calculating a gain based on a measured value from the amplitude measurement unit and setting the gain as an initial internal gain value of the focus error normalization unit before the focus control is pulled in.

30. A semiconductor device comprising:
a focus error detection unit for detecting a signal which corresponds to a shift in a position of a focus of an optical beam with respect to an information surface or a surface of an information carrier;
a light amount detection unit for detecting a signal which corresponds to an amount of reflected light of the optical beam from the information carrier;
a focus error normalization unit for normalizing a signal from the focus error detection unit based on a signal from the light amount detection unit and an internal gain;
a focus control unit for changing a convergence state of the optical beam such that the focus of the optical beam follows the information surface of the information carrier in accordance with a signal from the focus error normalization unit;
a spherical aberration setting unit for setting a spherical aberration adapted for one information surface of the information carrier when the focus control unit is not working;
an amplitude measurement unit for measuring an amplitude of the signal from the focus error detection unit when the focus control unit is not working;
a maximum light amount detection unit for detecting a signal level at a maximum point of a signal from the light amount detection unit when the focus control unit is not working;
a light amount measurement selection unit for selecting the maximum point detected by the maximum light amount detection unit when the optical beam passes near the one information surface on which the spherical aberration setting unit is operated; and
a gain calculation unit for calculating a gain based on amplitude information from the amplitude measurement unit and light amount information from the light amount measurement selection unit and setting the gain as the internal gain of the focus error normalization unit.

31. The semiconductor device according to claim 30, further comprising a largest and smallest timing detection unit for detecting a timing at which the signal from the focus error detection unit becomes the largest and a timing at which the signal from the focus error detection unit becomes the smallest,
wherein the light amount measurement selection unit selects a signal level measured by the maximum light amount detection unit between the two timings obtained from the largest and smallest timing detection unit.

32. The semiconductor device according to claim 30, further comprising an amplitude timing detection unit for detecting a timing at which the number of amplitudes of the signal from the focus error detection unit reaches the number of the information surfaces up to the one information surface on which the spherical aberration setting unit is operated,
wherein the light amount measurement selection unit selects a signal level measured by the maximum light amount detection unit at a timing closest to the timing detected by the amplitude number timing detection unit.

33. The semiconductor device according to claim 30, further comprising a light amount maximum number timing detection unit for detecting a timing at which the number of maximums of the signal from the light amount detection unit reaches the number of information surfaces up to the one information surface on which the spherical aberration setting unit is operated,
wherein the light amount measurement selection unit selects a signal level measured by the maximum light amount detection unit at a timing closest to the timing at which the light amount maximum number timing detection unit detects.

34. A semiconductor device comprising:
a focus error detection unit for detecting a signal which corresponds to a shift in a position of a focus of an optical beam with respect to an information surface or a surface of an information carrier;
a light amount detection unit for detecting a signal which corresponds to an amount of reflected light of the optical beam from the information carrier;
a focus error normalization unit for normalizing a signal from the focus error detection unit based on a signal from the light amount detection unit and an internal gain;
a focus control unit for changing a convergence state of the optical beam such that the focus of the optical beam follows the information surface of the information carrier in accordance with a signal from the focus error normalization unit;
a spherical aberration setting unit for setting a spherical aberration adapted for an information surface closest to the surface of the information carrier when the focus control unit is not working;
an amplitude measurement unit for measuring an amplitude of the signal from the focus error detection unit when the focus control unit is not working;
a maximum light amount detection unit for detecting a signal level at a maximum point of a signal from the light amount detection unit when the focus control unit is not working;
a first light amount measurement selection unit for selecting a signal level at a first maximum point detected by the maximum light amount detection unit when the focus control unit is not working; and a gain calculation unit for calculating a gain based on a signal from the amplitude measurement unit and a signal from the first light amount measurement selection unit and setting the gain as the internal gain of the focus error normalization unit.

35. A semiconductor device comprising:
a focus error detection unit for detecting a signal which corresponds to a shift in a position of a focus of an optical beam with respect to an information surface or a surface of an information carrier;
a light amount detection unit for detecting a signal which corresponds to an amount of reflected light of the optical beam from the information carrier;
a focus error normalization unit for normalizing a signal from the focus error detection unit based on a signal from the light amount detection unit and an internal gain;
a focus control unit for changing a convergence state of the optical beam such that the focus of the optical beam follows the information surface of the information carrier in accordance with a signal from the focus error normalization unit;
a spherical aberration setting unit for setting a spherical aberration adapted for an information surface furthest from the surface of the information carrier when the focus control unit is not working;
an amplitude measurement unit for measuring an amplitude of the signal from the focus error detection unit when the focus control unit is not working;
a maximum light amount detection unit for detecting a signal level at a maximum point of the signal from the light amount detection unit when the focus control unit is not working;
a last light amount measurement selection unit for selecting a signal level at a last maximum point detected by the maximum light amount detection unit when the focus control unit is not working; and
a gain calculation unit for calculating a gain based on a signal from the amplitude measurement unit and a signal from the last light amount measurement selection unit and setting the gain as the internal gain of the focus error normalization unit.

36. A semiconductor device comprising:
a focus error detection unit for detecting a signal which corresponds to a shift in a position of a focus of an optical beam with respect to an information surface or a surface of an information carrier;
a light amount detection unit for detecting a signal which corresponds to an amount of reflected light of the optical beam from the information carrier;
a focus error normalization unit for normalizing a signal from the focus error detection unit based on a signal from the light amount detection unit and an internal gain;
a focus control unit for changing a convergence state of the optical beam such that the focus of the optical beam follows the information surface of the information carrier in accordance with a signal from the focus error normalization unit;
a spherical aberration adjustment unit for adjusting a spherical aberration so as to be optimum for an information surface to be a target of the focus control when the focus control unit is working;
an amplitude measurement unit for measuring an amplitude of the signal from the focus error detection unit after the adjustment by the spherical aberration adjustment unit;
a light amount measurement unit for measuring a level of the signal from the light amount detection unit after the adjustment by the spherical aberration adjustment unit; and
a gain calculation unit for calculating a gain based on amplitude information from the amplitude measurement unit and light amount information from the light amount measurement unit and setting the gain as the internal gain of the focus error normalization unit.

37. A semiconductor device comprising:
a focus error detection unit for detecting a signal which corresponds to a shift in a position of a focus of an optical beam with respect to an information surface or a surface of an information carrier;
a light amount detection unit for detecting a signal which corresponds to an amount of reflected light of the optical beam from the information carrier;
a focus error normalization unit for normalizing a signal from the focus error detection unit based on a signal from the light amount detection unit and an internal gain;
a focus control unit for changing a convergence state of the optical beam such that the focus of the optical beam follows the information surface of the information carrier in accordance with a signal from the focus error normalization unit;
a spherical aberration setting unit for setting a spherical aberration adapted for one information surface of the information carrier when the focus control unit is not working;
an amplitude measurement unit for measuring an amplitude of the signal from the focus error detection unit;
a focus pull-in unit for operating the focus control unit with respect to the one information surface on which the spherical aberration setting unit is operated;
a light amount measurement unit for measuring a level of the signal from the light amount detection unit;
a gain calculation unit for calculating a gain based on amplitude information from the amplitude measurement unit and light amount information from an after-pull-in light amount measurement unit and setting the gain as the internal gain of the focus error normalization unit;
a spherical aberration adjustment unit for adjusting a spherical aberration so as to be optimum for an information surface to be a target of the focus control when the focus control unit is working;
a gain compensation unit for compensating the internal gain of the focus error normalization unit depending upon a spherical aberration amount adjusted by the spherical aberration adjustment unit.

38. The semiconductor device according to claim 20, further comprising a layer-depending gain switching unit which has internal gain candidates set for each of the information surfaces of the information carrier and switches among the internal gain candidates in accordance with the information surface which is a target of the focus control to output an internal gain candidate,
wherein an output of the gain calculation unit is set for all of the internal gain candidates of the layer-depending gain switching unit.

* * * * *